(12) United States Patent
Uchibori

(10) Patent No.: US 9,770,662 B2
(45) Date of Patent: Sep. 26, 2017

(54) INFORMATION STORAGE MEDIUM, SERVER, NETWORK SYSTEM, AND GAME SERVICE-PROVIDING METHOD

(75) Inventor: Tamaki Uchibori, Yokohama (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 623 days.

(21) Appl. No.: 13/227,696

(22) Filed: Sep. 8, 2011

(65) Prior Publication Data

US 2012/0064969 A1 Mar. 15, 2012

(30) Foreign Application Priority Data

Sep. 14, 2010 (JP) ................. 2010-206109

(51) Int. Cl.
*A63F 13/00* (2014.01)
*A63F 13/795* (2014.01)
*A63F 13/335* (2014.01)

(52) U.S. Cl.
CPC .......... *A63F 13/795* (2014.09); *A63F 13/335* (2014.09)

(58) Field of Classification Search
CPC ............ A63F 2001/008; A63F 2001/04; A63F 2001/0441; A63F 2001/0483; A63F 13/795; A63F 13/335
USPC ........................................................ 463/42
See application file for complete search history.

(56) References Cited

U.S. PATENT DOCUMENTS

| | | | |
|---|---|---|---|
| 6,910,967 B2 | 6/2005 | Yamaguchi | |
| 7,311,608 B1 * | 12/2007 | Danieli et al. | 463/42 |
| 2005/0204009 A1 * | 9/2005 | Hazarika | G06Q 10/107 709/206 |
| 2008/0004117 A1 * | 1/2008 | Stamper | G07F 17/32 463/42 |

FOREIGN PATENT DOCUMENTS

JP   A-2002-166057   6/2002

OTHER PUBLICATIONS

Youtube video of Army of Two-The Co-op mode Uploaded by thecoopmode Jan. 18, 2010.*
Youtube video of Army of Two-Op-Gameplay |HD https://www.youtube.com/watch?v=l-kNaCFbt5s Uploaded by badboy316 Jun. 3, 2011.*

* cited by examiner

*Primary Examiner* — Milap Shah
*Assistant Examiner* — Jeffrey Wong
(74) *Attorney, Agent, or Firm* — Posz Law Group, PLC

(57) ABSTRACT

A server performs a parameter calculation process that changes an event parameter of a game event based on event identification information that is linked to a help destination regardless of whether or not a user of a second terminal is a member of a game application when the server has received help request data from a first terminal and also received an access request for the help destination (help URL) about the first terminal from the second terminal.

16 Claims, 29 Drawing Sheets

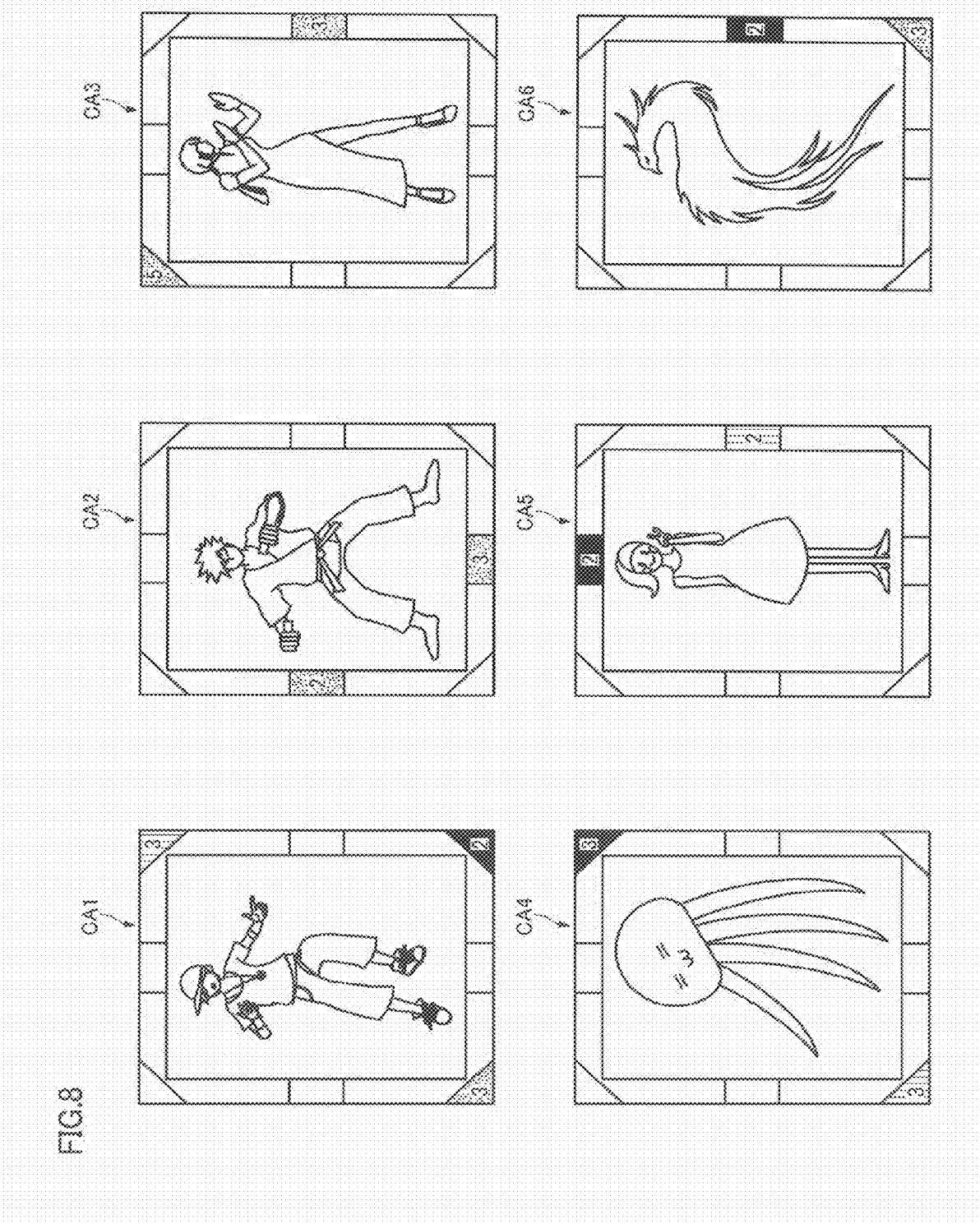

FIG.9

| CARD | BASIC PARAMETER (X) | ATTACK CAPABILITY PARAMETER K | | | SPECIAL PARAMETER (KS) |
|---|---|---|---|---|---|
| | | RED (KR) | BLUE (KB) | YELLOW (KY) | |
| CA1 | 100 | 10 | 30 | 20 | 50 |
| CA2 | 150 | 20 | 10 | 30 | 50 |
| CA3 | 100 | 10 | 20 | 30 | 60 |
| CA4 | 150 | 10 | 20 | 30 | 60 |
| CA5 | 150 | 30 | 10 | 20 | 60 |
| CA6 | 200 | 30 | 10 | 10 | 60 |
| ... | ... | ... | ... | ... | ... |

STRENGTH PARAMETER LP2 OF OPPOSING CHARACTER = BASIC PARAMETER X (100) OF CA3
+ BASIC PARAMETER X (150) OF CA5
+ BASIC PARAMETER X (200) OF CA6

FIG.12A
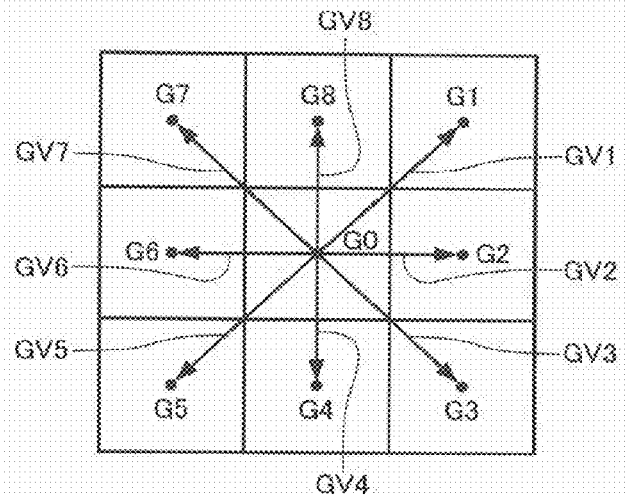
FIG.12B
|  | GV1 | GV2 | GV3 | GV4 | GV5 | GV6 | GV7 | GV8 |
|---|---|---|---|---|---|---|---|---|
| CA1 | 3(Y) | 0 | 2(B) | 0 | 3(R) | 0 | 0 | 0 |
| CA2 | 0 | 0 | 0 | 3(R) | 0 | 2(R) | 0 | 0 |
| CA3 | 0 | 3(R) | 0 | 0 | 0 | 0 | 5(R) | 0 |
| CA4 | 3(B) | 0 | 0 | 0 | 3(Y) | 0 | 0 | 0 |
| CA5 | 0 | 2(Y) | 0 | 0 | 0 | 0 | 0 | 2(B) |
| CA6 | 0 | 2(B) | 3(R) | 0 | 0 | 0 | 0 | 0 |
| ⋮ | ⋮ | ⋮ | ⋮ | ⋮ | ⋮ | ⋮ | ⋮ | ⋮ |
FIG.12C
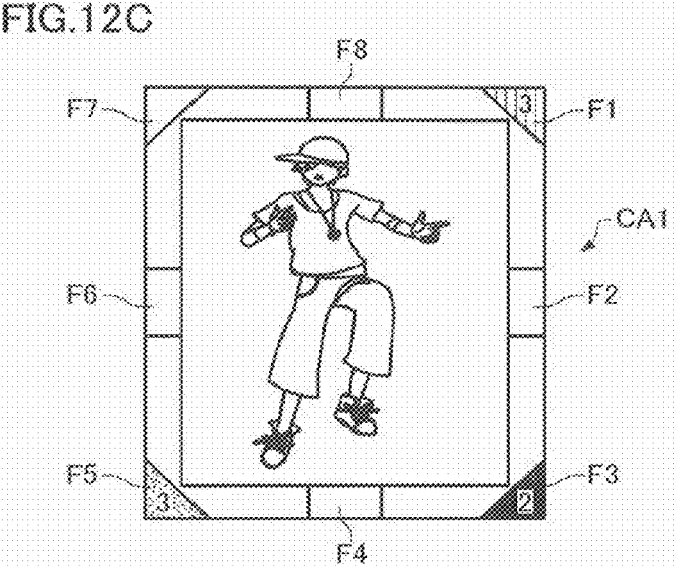

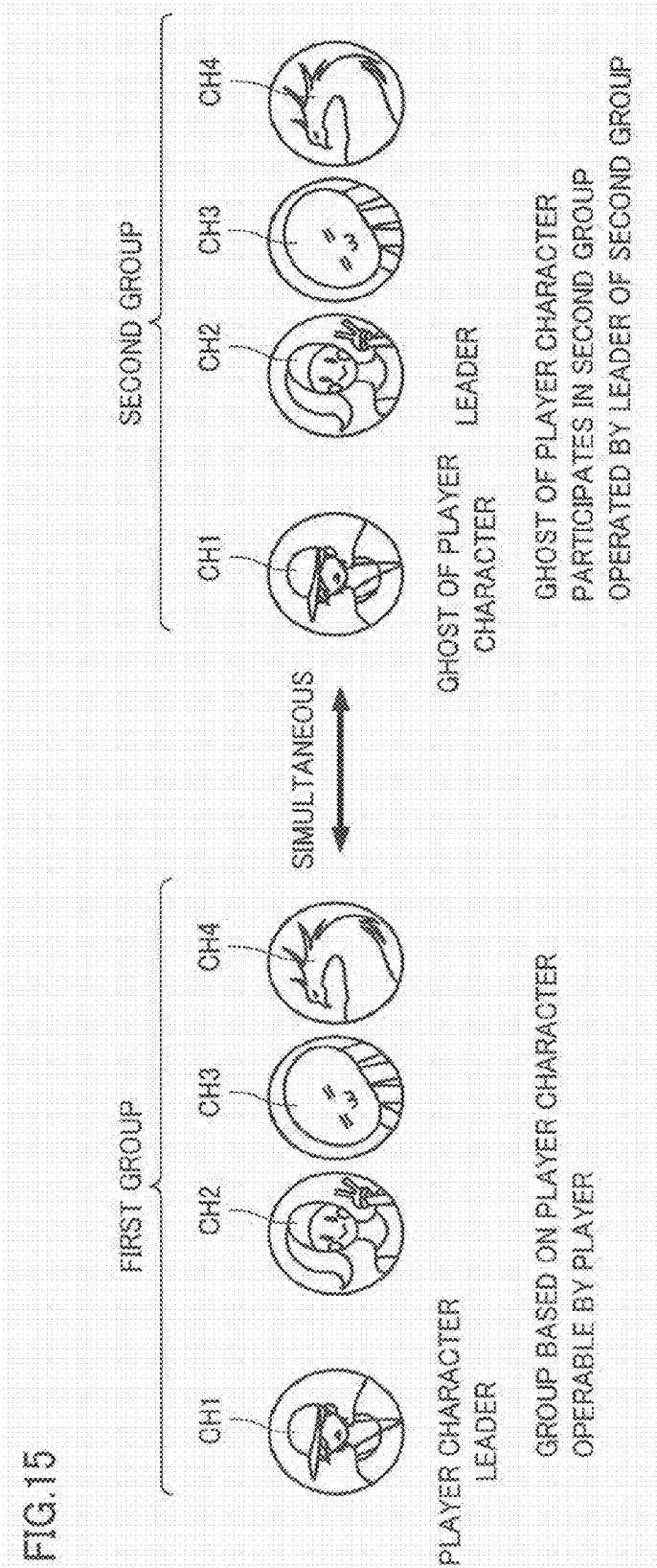

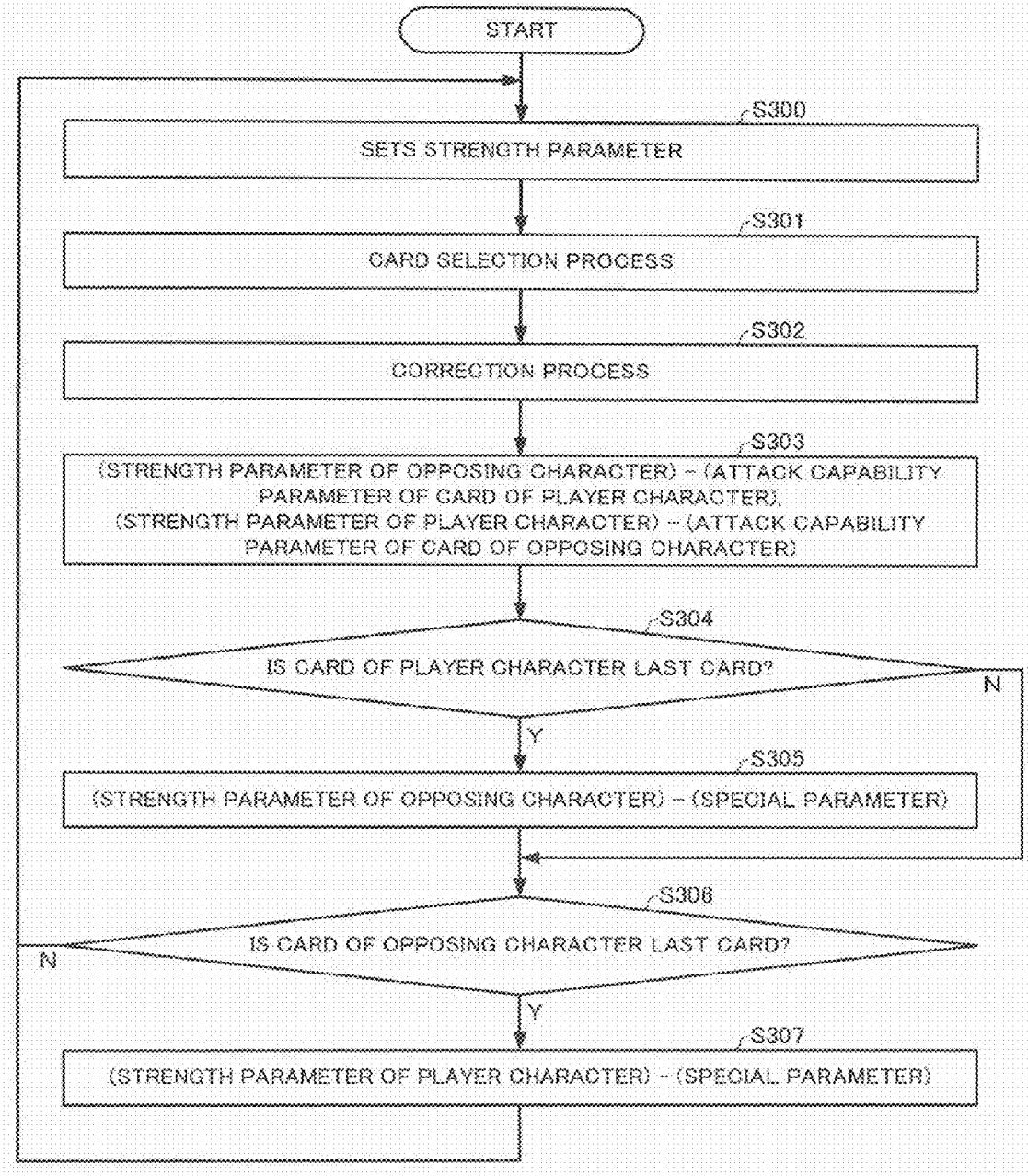

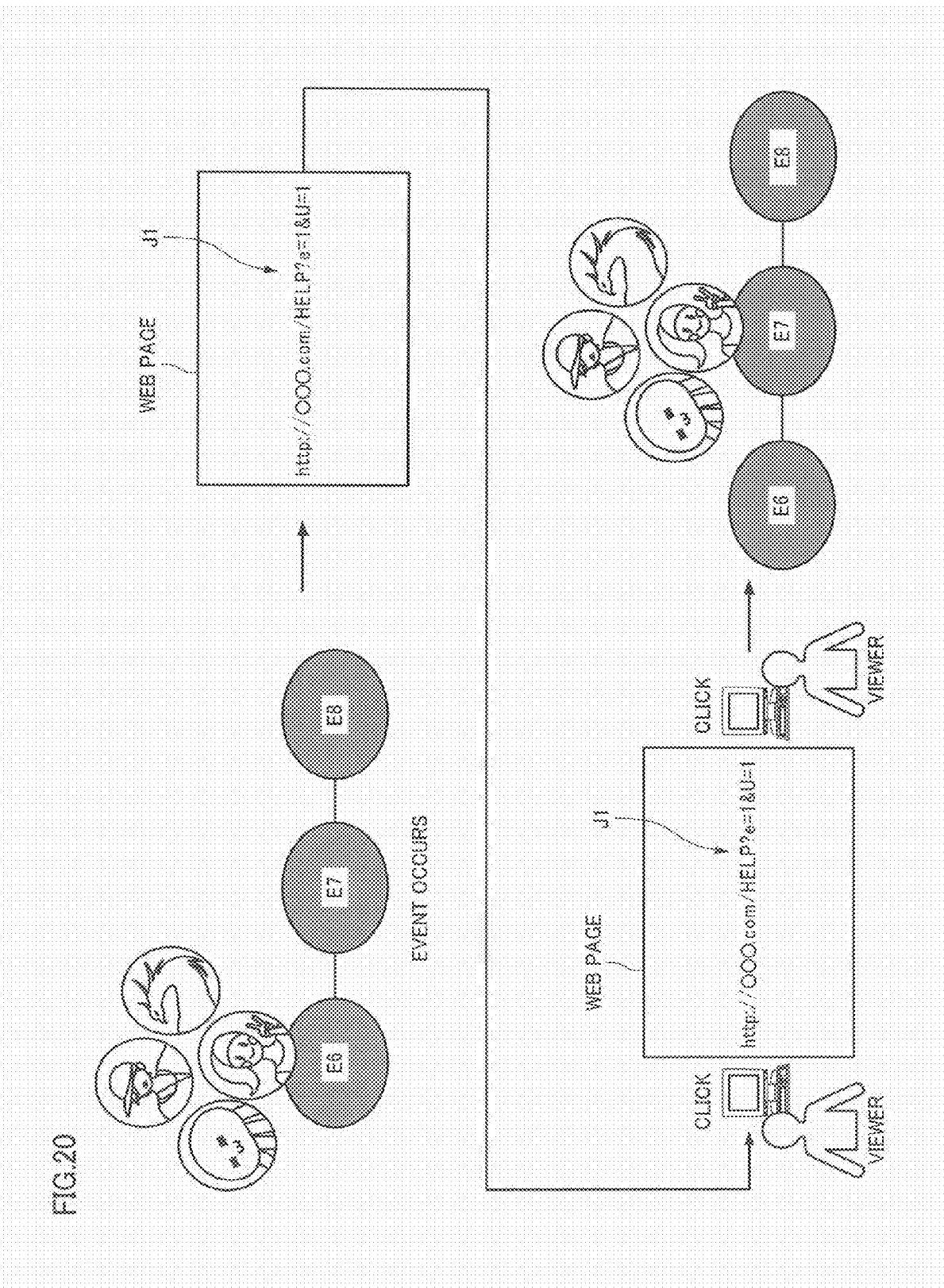

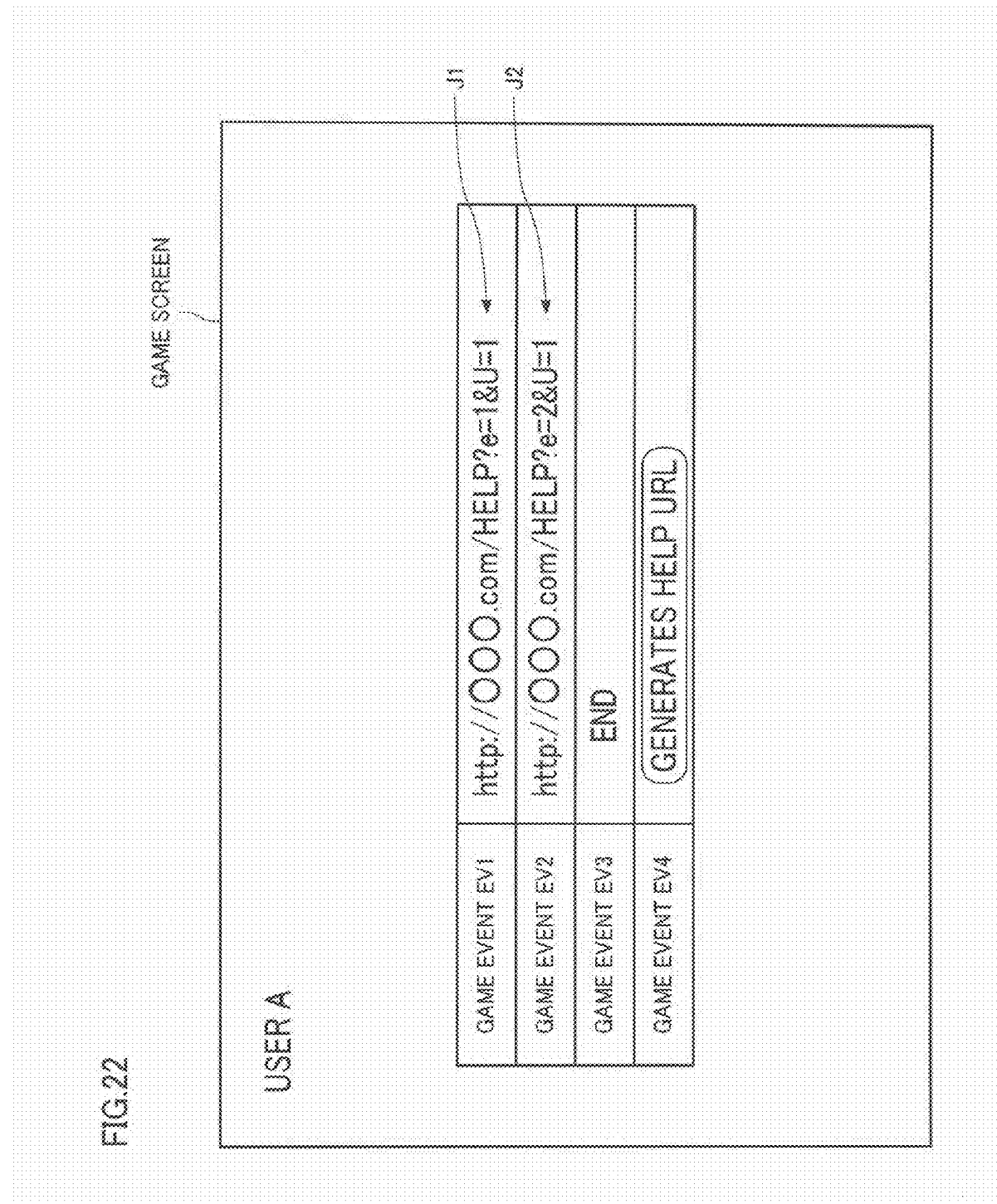

INFORMATION STORAGE MEDIUM, SERVER, NETWORK SYSTEM, AND GAME SERVICE-PROVIDING METHOD

Japanese Patent Application No. 2010-206109, filed on Sep. 14, 2010, is hereby incorporated by reference in its entirety.

BACKGROUND OF THE INVENTION

The present invention relates to an information storage medium, a server, a network system, and a game service-providing method.

A network system referred to as a social networking service (SNS) that provides the user with a community-type service has been known. Such a network system allows the user to add a friend to a friend list, and allow the friend to read the diary of the user, or exchange an e-mail with the friend. In recent years, such an SNS has provided the user with an application program (e.g., game).

A game provided by such an SNS may be designed so that the user can obtain a benefit when the user has prompted another user to participate in the game.

JP-A-2002-166057 discloses a network-type game system. Such a network-type game system makes it possible for the game provider to allow a number of people to enjoy participating in the game via a network.

A game provided by such an SNS may be designed so that the user prompts another user to participate in the game so that the user can be helped by the other user. However, the other user may hesitate to participate in the game.

SUMMARY

According to a first aspect of the invention, there is provided a non-transitory computer-readable information storage medium storing a server program that transmits data to terminals including a first terminal and a second terminal via a network in response to access requests, the server program causing a computer to function as:

a member determination section that, when game play request data from one of the terminals has been received, determines whether or not a user of the one of the terminals is a member of a game application based on the received game play request data;

a game service-providing section that transmits game information about the game application to the one of the terminals when the game play request data has been received from the one of the terminals and the user of the one of the terminals has been determined to be a member of the game application;

a help destination generation section that, when help request data about a game event executed by the game application has been received from the first terminal, generates a help destination that is linked to user identification information about a first user who is a user of the first terminal and has been determined to be a member of the game application and event identification information about the game event; and a notice information-providing section that, when notice information request data about the first user has been received from the second terminal, transmits notice information about the first user including the generated help destination that is linked to the user identification information about the first user to the second terminal, the game service-providing section performing a parameter calculation process that changes an event parameter of the game event based on the event identification information that is linked to the help destination regardless of whether or not a second user who is a user of the second terminal is a member of the game application when an access request for the help destination has been received from the second terminal.

According to a second aspect of the invention, there is provided a server that transmits data to terminals including a first terminal and a second terminal via a network in response to access requests, the server comprising:

a member determination section that, when game play request data from one of the terminals has been received, determines whether or not a user of the one of the terminals is a member of a game application based on the received game play request data;

a game service-providing section that transmits game information about the game application to the one of the terminals when the game play request data has been received from the one of the terminals and the user of the one of the terminals has been determined to be a member of the game application;

a help destination generation section that, when help request data about a game event executed by the game application has been received from the first terminal, generates a help destination that is linked to user identification information about a first user who is a user of the first terminal and has been determined to be a member of the game application and event identification information about the game event; and a notice information-providing section that, when notice information request data about the first user has been received from the second terminal, transmits notice information about the first user including the generated help destination that is linked to the user identification information about the first user to the second terminal, the game service-providing section performing a parameter calculation process that changes an event parameter of the game event based on the event identification information that is linked to the help destination regardless of whether or not a second user who is a user of the second terminal is a member of the game application when an access request for the help destination has been received from the second terminal.

According to a third aspect of the invention, there is provided a network system comprising a server and terminals including a first terminal and a second terminal, the server and the terminals exchanging data via a network, the server including:

a member determination section that, when game play request data from one of the terminals has been received, determines whether or not a user of the one of the terminals is a member of a game application based on the received game play request data;

a game service-providing section that transmits game information about the game application to the one of the terminals when the game play request data has been received from the one of the terminals of the user of the one of the terminals has been determined to be a member of the game application;

a help destination generation section that, when help request data about a game event executed by the game application has been received from the first terminal, generates a help destination that is linked to user identification information about a first user who is a user of the first terminal and has been determined to be a member of the game application and event identification information about the game event; and a notice information-providing section that, when notice information request data about the first user has been received from the second terminal, transmits notice information about the first user including the generated help destination that is linked to the user identification information about the first user to the second terminal, the game service-providing section performing a parameter calculation process that changes an event parameter of the game event based on the event identification information that is linked to the help destination regardless of whether or not a second user who is a user of the second terminal is a member of the game application when an access request for the help destination has been received from the second terminal.

the first terminal performing a process that transmits the game play request data to the server and receives game information about the game application under a predetermined condition, and a process that transmits the help request data about the game event executed by the game application, and the second terminal performing a process that transmits the notice information request data about the first user to the server and receives the notice information about the first user including the help destination that is linked to the user identification information about the first user, and a process that transmits an access request for the help destination to the server based on input information.

According to a fourth aspect of the invention, there is provided a game service-providing method that is implemented by a server that transmits data to terminals including a first terminal and a second terminal via a network in response to access requests, the method comprising:

determining whether or not a user of one of the terminals is a member of a game application based on game play request data when the game play request data has been received from the one of the terminals;

transmitting game information about the game application to the one of the terminals when the game play request data has been received from the one of the terminals and the user of the one of the terminals has been determined to be a member of the game application;

generating a help destination that is linked to user identification information about a first user who is a user of the first terminal and has been determined to be a member of the game application and event identification information about a game event executed by the game application when help request data about the game event has been received from the first terminal;

transmitting notice information about the first user including the generated help destination that is linked to the user identification information about the first user to the second terminal when notice information request data about the first user has been received from the second terminal; and performing a parameter calculation process that changes an event parameter of the game event based on the event identification information that is linked to the help destination regardless of whether or not a second user who is a user of the second terminal is a member of the game application when an access request for the help destination has been received from the second terminal.

BRIEF DESCRIPTION OF THE SEVERAL VIEWS OF THE DRAWING

FIG. 8 is a diagram illustrating a card according to one embodiment of the invention.

FIG. 9 is a table illustrating card data (parameter) according to one embodiment of the invention.

FIGS. 12A to 12C are diagrams illustrating specific positional relationship data.

FIG. 15 is a diagram illustrating a group generation process according to one embodiment of the invention.

FIG. 19B is a flowchart illustrating the details of a battle process according to one embodiment of the invention.

FIG. 20 is a diagram illustrating a help process according to one embodiment of the invention.

FIG. 22 illustrates a help request process according to one embodiment of the invention.

DETAILED DESCRIPTION OF THE EMBODIMENT

Figure 1:
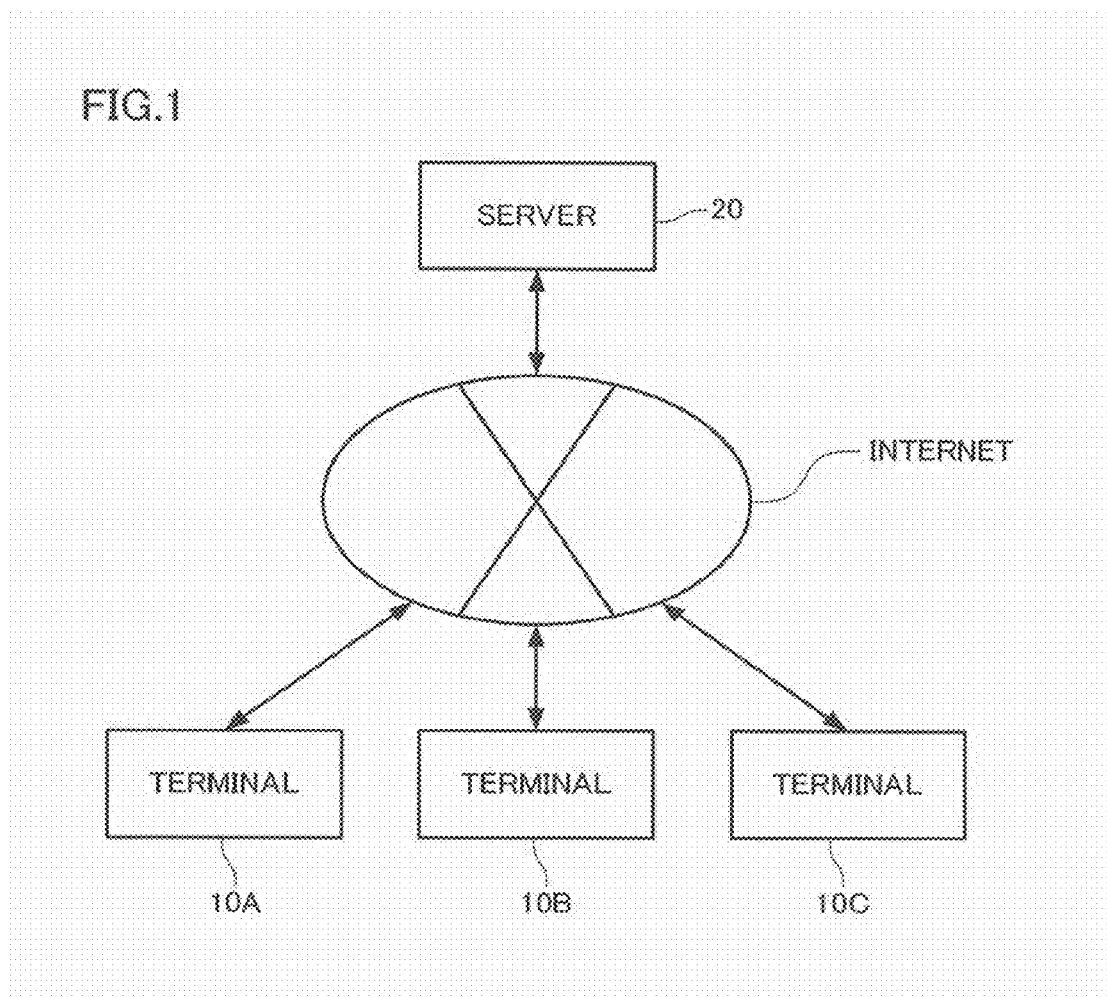
FIG. 1 illustrates an example of a network diagram of a network system according to one embodiment of the invention.

The invention may provide an information storage medium, a server, a network system, and a game service-providing method that allow a user who is not a member of a game application to easily help another user.

(1) One embodiment of the invention relates to a non-transitory computer-readable information storage medium storing a server program that transmits data to terminals including a first terminal and a second terminal via a network in response to access requests, the server program causing a computer to function as:

a member determination section that, when game play request data from one of the terminals has been received, determines whether or not a user of the one of the terminals is a member of a game application based on the received game play request data;

a game service-providing section that transmits game information about the game application to the one of the terminals when the game play request data has been received from the one of the terminals and the user of the one of the terminals has been determined to be a member of the game application;

a help destination generation section that, when help request data about a game event executed by the game application has been received from the first terminal, generates a help destination that is linked to user identification information about a first user who is a user of the first terminal and has been determined to be a member of the game application and event identification information about the game event; and a notice information-providing section that, when notice information request data about the first user has been received from the second terminal, transmits notice information about the first user including the generated help destination that is linked to the user identification information about the first user to the second terminal, the game service-providing section performing a parameter calculation process that changes an event parameter of the game event based on the event identification information that is linked to the help destination regardless of whether or not a second user who is a user of the second terminal is a member of the game application when an access request for the help destination has been received from the second terminal.

According to the information storage medium, the user of the second terminal can help the game event by merely clicking the help destination.

(2) In the above information storage medium, the game service-providing section may perform a help determination process that determines whether or not to help the first user based on a game situation of the first user when an access request for the help destination has been received from the second terminal, and then may perform a parameter calculation process that changes an event parameter of the game event when the game service-providing section has been determined to help the first user.

According to this feature, since whether or not to help the first user is determined based on the game situation, it is possible to advantageously help the first user while reflecting the game situation of the player.

(3) In the above information storage medium, the game service-providing section may perform a movement calculation process that moves a character of the first user in a game space based on input information received from the first terminal, and may perform the help determination process that determines whether or not to help the first user based on a positional relationship between a position of the character of the first user and an event occurrence position of the game event in the game space.

According to this feature, since whether or not to help the first user is determined based on the event occurrence position and the position of the character of the first user, it is possible to more appropriately help the first user.

(4) In the above information storage medium, the game service-providing section may determine to help the first user when a distance between the position of the character of the first user and the event occurrence position of the game event is equal to or shorter than a predetermined distance.

According to this feature, it is possible to help the first user when the distance between the event occurrence position and the position of the character of the first user is equal to or shorter than a predetermined distance. Specifically, it is possible to help the first user when the character of the first user is positioned close to the event occurrence position.

(5) In the above information storage medium, the game service-providing section may determine whether or not to help the first user based on an achievement rate of the game event.

According to this feature, it is possible to help the first user corresponding to the achievement rate of the game event.

(6) In the above information storage medium, the game service-providing section may determine whether or not to help the first user based on a predetermined period that is set based on a time at which the help destination has been generated.

According to this feature, it is possible to help the first user while reflecting an appropriate period.

(7) In the above information storage medium, the game service-providing section may increase a user point parameter of the first user used by the game application when an access request for the help destination has been received from the second terminal.

According to this feature, the user points increase when the user helps the first user. This prompts the first user to request help.

(8) In the above information storage medium, the game service-providing section may decrease a user point parameter of the first user used by the game application when the help request data about the game event executed by the game application has been received from the first user.

According to this feature, it is possible to prompt the user to request help at the sacrifice a decrease in the user point parameter of the first user. This makes it possible to implement a help process with improved game playability.

(9) In the above information storage medium, the member determination section may determine whether or not the second user is a member of the game application based on data included in an access request for the help destination when the access request for the help destination has been received from the second terminal; and the game service-providing section may increase a user point parameter of the second user used by a game process of the game application when the second user is a member of the game application.

This feature is advantageous for the user of the second terminal when the user of the second terminal is a member of the game application. Therefore, the first user can request more help.

(10) Another embodiment of the invention relates to a server that transmits data to terminals including a first terminal and a second terminal via a network in response to access requests, the server comprising:

a member determination section that, when game play request data from one of the terminals has been received, determines whether or not a user of the one of the terminals is a member of a game application based on the received game play request data;

a game service-providing section that transmits game information about the game application to the one of the terminals when the game play request data has been received from the one of the terminals and the user of the one of the terminals has been determined to be a member of the game application;

a help destination generation section that, when help request data about a game event executed by the game application has been received from the first terminal, generates a help destination that is linked to user identification information about a first user who is a user of the first terminal and has been determined to be a member of the game application and event identification information about the game event; and a notice information-providing section that, when notice information request data about the first user has been received from the second terminal, transmits notice information about the first user including the generated help destination that is linked to the user identification information about the first user to the second terminal, the game service-providing section performing a parameter calculation process that changes an event parameter of the game event based on the event identification information that is linked to the help destination regardless of whether or not a second user who is a user of the second terminal is a member of the game application when an access request for the help destination has been received from the second terminal.

(11) Another embodiment of the invention relates to a network system comprising a server and terminals including a first terminal and a second terminal, the server and the terminals exchanging data via a network, the server including:

a member determination section that, when game play request data from one of the terminals has been received, determines whether or not a user of the one of the terminals is a member of a game application based on the received game play request data;

a game service-providing section that transmits game information about the game application to the one of the terminals when the game play request data has been received from the one of the terminals of the user of the one of the terminals has been determined to be a member of the game application;

a help destination generation section that, when help request data about a game event executed by the game application has been received from the first terminal, generates a help destination that is linked to user identification information about a first user who is a user of the first terminal and has been determined to be a member of the game application and event identification information about the game event; and a notice information-providing section that, when notice information request data about the first user has been received from the second terminal, transmits notice information about the first user including the generated help destination that is linked to the user identification information about the first user to the second terminal, the game service-providing section performing a parameter calculation process that changes an event parameter of the game event based on the event identification information that is linked to the help destination regardless of whether or not a second user who is a user of the second terminal is a member of the game application when an access request for the help destination has been received from the second terminal.

the first terminal performing a process that transmits the game play request data to the server and receives game information about the game application under a predetermined condition, and a process that transmits the help request data about the game event executed by the game application, and the second terminal performing a process that transmits the notice information request data about the first user to the server and receives the notice information about the first user including the help destination that is linked to the user identification information about the first user, and a process that transmits an access request for the help destination to the server based on input information.

(12) A further embodiment of the invention relates to a game service-providing method that is implemented by a server that transmits data to terminals including a first terminal and a second terminal via a network in response to access requests, the method comprising:

determining whether or not a user of one of the terminals is a member of a game application based on game play request data when the game play request data has been received from the one of the terminals;

transmitting game information about the game application to the one of the terminals when the game play request data has been received from the one of the terminals and the user of the one of the terminals has been determined to be a member of the game application;

generating a help destination that is linked to user identification information about a first user who is a user of the first terminal and has been determined to be a member of the game application and event identification information about a game event executed by the game application when help request data about the game event has been received from the first terminal;

transmitting notice information about the first user including the generated help destination that is linked to the user identification information about the first user to the second terminal when notice information request data about the first user has been received from the second terminal; and performing a parameter calculation process that changes an event parameter of the game event based on the event identification information that is linked to the help destination regardless of whether or not a second user who is a user of the second terminal is a member of the game application when an access request for the help destination has been received from the second terminal.

Exemplary embodiments of the invention are described below. Note that the following embodiments do not unduly limit the scope of the invention as stated in the claims. Note also that all of the elements described below should not necessarily be taken as essential elements of the invention.

1. Network System

FIG. 1 illustrates a network system according to one embodiment of the invention. The network system includes a plurality of terminals 10 and a server 20. As illustrated in FIG. 1, the network system is configured so that the server 20 that provides a service and the terminals 10 can be connected to a network.

The server 20 is an information processing device that provides a service that allows a plurality of users to communicate. In one embodiment of the invention, the server 20 provides a community-type service that is referred to as a social networking service (SNS).

Specifically, the server 20 transmits user information (e.g., user name, diary, notice information, and game progress) to a user who has logged in and another user who maintains a friend relationship with the user so that the users can communicate. The server 20 may provide the service to only a user who has registered himself as a member.

For example, the server 20 has a web server function and a mail server (mail delivery) function. The terminal 10 includes a web browser that allows the user to browse a web page (Hyper Text Markup Language (HTML) format data). Specifically, terminal 10 accesses the SNS Uniform Resource Locator (URL) of the server 20, and transmits the user name and the password. When the user has successfully logged into the server 20, the server 20 transmits the web page of the user to the terminal 10. The terminal 10 displays the web page of the user received from the server 20 on the web browser displayed on a display section 190.

When the server 20 has received information that indicates that one user and another user request a friend relationship with each other, the server 20 registers identification information about each user so that the identification information is linked to each other.

For example, when the server 20 has received information that indicates that a user A requests a friend relationship with a user B from a terminal 10A, the server 20 transmits the friend request from the user A to a terminal 10B of the user B. When the server 20 has received information that indicates that the user B accepts the friend request from the user A from the terminal 10B, the server 20 determines that the user A and the user B have established a friend relationship. The server 20 then registers the identification information about the user B so that the identification information about the user B is linked to the identification information about the user A, and registers the identification information about the user A so that the identification information about the user A is linked to the identification information about the user B.

The SNS according to one embodiment of the invention allows each user to post notice information. For example, the user A posts the notice information by transmitting the notice information input using the terminal A of the user A to the server 20 from the terminal 10A. The server 20 transmits data (web page) including the notice information posted by the user A to the terminal 10A so that the terminal 10A can display the notice information on the display section.

The server 20 allows the user B who is registered in a friend list to view the notice information from the terminal A of the user A. For example, the user B can view the notice information posted by the user A, and comment on or evaluate (e.g., "Great!") the notice information posted by the user A.

The server 20 may allow only a limited user to view user information (e.g., notice information and game situation) about each user based on viewing restriction information (browse restriction information) about each user. For example, when the user A allows only his friends to view the user information, the server 20 allows only users (e.g., users B, C, D, and E) who maintain a friend relationship with the user A to view the notice information posted by the user A, and does not allow a user (e.g., user F) who does not maintain a friend relationship with the user A to view the notice information posted by the user. Note that the viewing restriction information indicates "ALL USERS", "ONLY FRIENDS", "FRIENDS OF FRIENDS", and the like. The server 20 receives a permission select request from the terminal of the user, and sets the viewing restriction information about the user.

The server 20 included in the network system according to one embodiment of the invention provides an online game service upon receiving a request from the terminal 10. Specifically, the terminal 10 transmits input information input by the user using the terminal 10 to the server 20 via the network, and the server 20 performs a game calculation process based on the received input information. The server 20 transmits the game calculation results to the terminal 10 via the network, and the terminal 10 displays the received game calculation results on the display section 190.

The terminal 10 is an information processing device such as a portable terminal (e.g., mobile phone, PHS terminal, smartphone, PDA, or portable game machine), a personal computer (PC), a game device, or an image generation device, and can connect to the server 20 via a network (e.g., Internet (WAN) and LAN). The terminal 10 and the server 20 may be connected via a cable communication channel or a wireless communication channel.

2. Configuration 2-1. Configuration of Terminal

Figure 2:
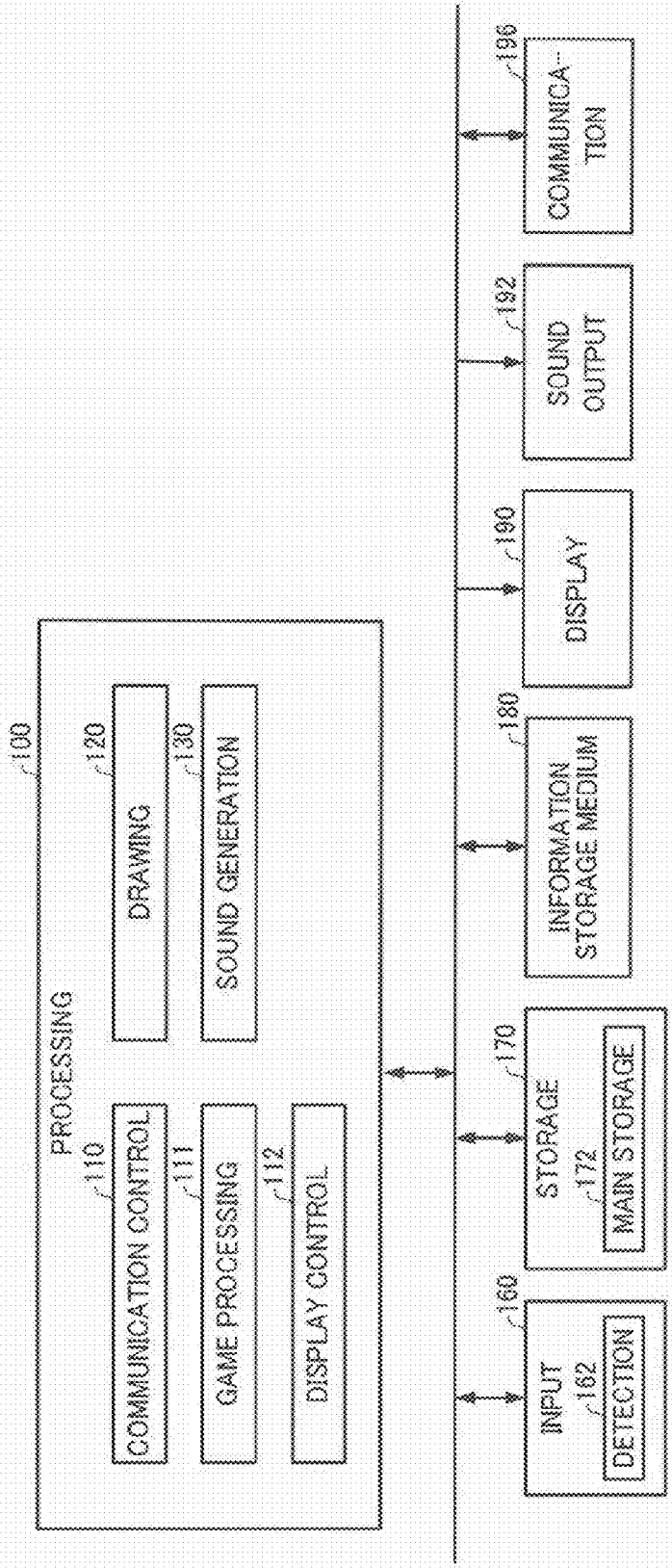
FIG. 2 is a functional block diagram of a terminal according to one embodiment of the invention.

FIG. 2 illustrates an example of a functional block diagram of the terminal according to one embodiment of the invention. Note that the terminal may have a configuration in which some of the elements (sections) illustrated in FIG. 2 are omitted.

An input section 160 allows the user to input information, and outputs the input information input by the user to a processing section. The input section 160 includes a detection section 162 that detects the input information (input signal) input by the user. The input section 160 may include a lever, a button, a steering wheel, a microphone, a touch panel display, a keyboard, a mouse, and the like.

The input section 160 may be an input device that includes an acceleration sensor that detects three-axis accelerations, a gyrosensor that detects angular velocity, and an imaging section. For example, the input device may be a device that is held or worn by the user. The term "input device" includes a controller that imitates a tool such as a sword-type controller or a gun-type controller that is held by the user, or a glove-type controller that is worn by the user. The term "input device" also includes a game device, a portable game device, a portable telephone, and the like that are integrated with the input device. The terminal according to one embodiment of the invention may include a plurality of input sections 160.

A storage section 170 serves as a work area for a processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 performs various processes according to one embodiment of the invention based on a program (data) stored in the information storage medium 180. A program that causes a computer to function as each section according to one embodiment of the invention (i.e., a program that causes a computer to execute the process of each section) may be stored in the information storage medium 180.

The terminal receives game data and a program that causes a computer to function as each section according to one embodiment of the invention that are stored in an information storage medium 280 or a storage section 270 included in the server 20 via a network, and stores the received program and data in the information storage medium 180. The terminal may store the program and the data received from the server 20 in the storage section 170. A case where the terminal (network system) operates based on a program and data received from the server 20 is also included within the scope of the invention.

The display section 190 outputs an image generated according to one embodiment of the invention. The function of the display section 190 may be implemented by a CRT, an LCD, a touch panel display, a head-mounted display (HMD), or the like. A sound output section 192 outputs sound generated according to one embodiment of the invention. The function of the sound output section 192 may be implemented by a speaker, a headphone, or the like.

The communication section 196 performs a control process for communicating with the outside (e.g., another terminal or server). The function of the communication section 196 may be implemented by hardware such as a processor or a communication ASIC, a program, or the like.

The processing section 100 (processor) performs a game process, an image generation process, a sound generation process, and the like based on the input information input using the input section 160, a program, and the like.

The processing section 100 performs various processes using the main storage section 172 of the storage section 170 as a work area. The function of the processing section 100 may be implemented by hardware such as a processor (e.g., CPU or DSP) or an ASIC (e.g., gate array), or a program.

The processing section 100 includes a communication control section 110, a game processing section 111, a display control section 112, a drawing section 120, and a sound generation section 130. Note that the processing section 100 may have a configuration in which some of these sections are omitted.

The communication control section 110 exchanges data with the server 20. For example, the communication control section 110 designates the IP address and the port number of the server, and exchanges data with the server 20. The communication control section 110 stores data received from the server 20 in the storage section 170, analyzes the received data, and performs a data transmission/reception control process, for example. The communication control section 110 may store destination information (IP address and port number) about the server in the information storage medium 180, and manage the destination information. The communication control section 110 may communicate with the server 20 when the communication control section 110 has received communication start input information from the user.

The communication control section 110 transmits the identification information about the user to the server 20, and receives data (web page of the user) about the user information from the server 20. For example, the communication control section 110 receives data including information (e.g., user name and notice information) about another user who maintains a friend relationship with the user from the server 20.

The communication control section 110 may generate a packet including data at the image drawing frame rate, and transmit the generated packet to the server 20. For example, when the frame rate is 60 fps, the communication control section 110 may transmit the packet to the server 20 every 1/60th of a second.

The communication control section 110 transmits input information for selecting an action object placed on a placement target object (i.e., input information for selecting a card placed on a deck) to the server via a network. The communication control section 110 may transmit input information for a placement target object (i.e., input information for selecting a deck) to the server via a network.

The communication control section 110 receives a battle process win-lose determination result from the server via a network.

The game processing section 111 performs a game calculation process. For example, the game processing section 111 starts the game when game start conditions have been satisfied, proceeds with the game, and finishes the game when game finish conditions have been satisfied.

The game processing section 111 may dispose an object (i.e., an object formed by a primitive such as a polygon, a free-form surface, or a subdivision surface) that represents a display object (e.g., player character, building, stadium, car, tree, pillar, wall, or map (topography)) in an object space.

The term "object space" refers to a virtual space, and includes a two-dimensional space and a three-dimensional space. The two-dimensional space is a space in which the object is disposed at two-dimensional coordinates (X, Y), and the three-dimensional space is a space in which the object is disposed at three-dimensional coordinates (X, Y, Z), for example. When the object space is a three-dimensional space, the game processing section 111 disposes the object in a world coordinate system. For example, the object space setting section 111 determines the position and the rotation angle (synonymous with orientation or direction; e.g., the rotation angle when the object is rotated clockwise around each of the X, Y, and Z axes in the world coordinate system) of the object in the world coordinate system, and disposes the object at the determined position (X, Y, Z) and the determined rotation angle (rotation angles around the X, Y, and Z axes).

The game processing section 111 may move a player character in the object space. Specifically, the game processing section 111 may cause the player character to move or make a motion (animation) in the object space based on the input information input by the player using the input section 160, a program (movement/motion algorithm), data (motion data), and the like. More specifically, the game processing section 111 may sequentially calculate movement information (movement parameters such as the position, rotation angle, speed, and acceleration) and motion information (position or rotation angle of each part that forms the object) about the player character every frame (e.g., 1/60th of a second). Note that the term "frame" refers to a time unit employed when performing the player character movement/motion process or the image generation process.

The display control section 112 displays data (e.g., web data, HTML format data, and web content data) received from the server 20 on the display section 190 using a browser or the like. The term "web content data" refers to graphics data and animation data. The web content data may be played using the web browser function of the terminal 10.

The display control section 112 displays a selected placement target object (deck or circuit). The display control section 112 also displays an action object (card) placed on the placement target object. Specifically, the display control section 112 displays deck data and card data about a player character received from the server.

The display control section 112 also displays a win-lose determination result received from the server.

The display control section 112 may display the game process performed by the game processing section 111, or may display an image generated by the drawing section 120 on the display section 190.

The drawing section 120 performs a drawing process based on the results of various processes (e.g., game process) performed by the processing section 100 to generate an image, and outputs the generated image to the display section 190. The drawing section 120 may generate a two-dimensional image or a three-dimensional image.

When the drawing section 120 generates a two-dimensional image, the drawing section 120 generates an image viewed sideways. For example, the drawing section 120 sets a priority to each object (sprite), and sequentially draws the objects in ascending of the priority. When the objects overlap, the drawing section 120 draws the object with a higher priority over the object with a lower priority.

When generating a three-dimensional game image, the drawing section 120 receives object data (model data) including vertex data (e.g., vertex position coordinates, texture coordinates, color data, normal vector, or alpha value) about each vertex of the object (model), and performs a vertex process (shading using a vertex shader) based on the vertex data included in the received object data. When performing the vertex process, the drawing section 120 may optionally perform a vertex generation process (tessellation, surface division, or polygon division) for dividing the polygon.

In the vertex process, the drawing section 120 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results.

The drawing section 120 then performs a rasterization process (scan conversion) based on the vertex data changed by the vertex process so that the surface of the polygon (primitive) is linked to pixels. The drawing section 120 then performs a pixel process (shading using a pixel shader or a fragment process) that draws the pixels of the image (fragments that form the display screen). In the pixel process, the drawing section 120 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to a drawing buffer (i.e., a buffer that can store image information corresponding to each pixel; VRAM or rendering target). Specifically, the pixel process includes a per-pixel process that sets or changes the image information (e.g., color, normal, luminance, and alpha value) corresponding to each pixel. The drawing section 120 thus generates an image viewed from a virtual camera (viewpoint) in the object space. When a plurality of virtual cameras (viewpoints) are provided, the drawing section 120 may generate an image so that images (divided images) viewed from the respective virtual cameras are displayed within one screen.

The drawing section 120 controls the virtual camera (viewpoint) for generating an image viewed from a given (arbitrary) viewpoint in the object space. Specifically, the drawing section 120 controls the position (X, Y, Z) or the rotation angle (e.g., the rotation angle of the virtual camera when the virtual camera is rotated clockwise around each of the X, Y, and Z axes) of the virtual camera in the world coordinate system when generating a three-dimensional image. More specifically, the drawing section 120 controls the viewpoint position, the line-of-sight direction, and the angle of view of the virtual camera. The drawing section 120 may rotate the virtual camera by a predetermined rotation angle. In this case, the drawing section 120 controls the virtual camera based on virtual camera data that specifies the position or the rotation angle of the virtual camera. When a plurality of virtual cameras (viewpoints) are provided, the drawing section 120 performs the above control process on each virtual camera.

For example, when photographing the object (e.g., player character) from behind using the virtual camera, the drawing section 120 controls the position or the direction of the virtual camera so that the virtual camera follows a change in the position or the direction of the object. In this case, the drawing section 120 may control the virtual camera based on information about the position, the direction, the speed, and the like of the object obtained by the movement/motion processing section 112. Alternatively, the drawing section 120 may set the virtual camera in a predetermined direction, or may move the virtual camera along a predetermined path. In this case, the drawing section 120 controls the virtual camera based on virtual camera data that specifies the position (moving path) or the direction of the virtual camera. When a plurality of virtual cameras (viewpoints) are provided, the drawing section 120 performs the above control process on each virtual camera.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process, and increases the degree of freedom of the drawing process, so that the representation capability can be significantly improved as compared with a fixed drawing process using hardware.

The drawing section 120 performs a geometric process, texture mapping, a hidden surface removal process, alpha-blending, and the like when drawing the object.

In the geometric process, the drawing section 120 subjects the object to coordinate transformation, clipping, perspective projection transformation, light source calculation, and the like. The object data (e.g., vertex position coordinates, texture coordinates, color data (luminance data), normal vector, or alpha-value) subjected to the geometric process (perspective transformation) is stored in an object data storage section.

The term "texture mapping" refers to a process that maps a texture (texel value) stored in a texture storage section of the storage section 170 onto the object. Specifically, the drawing section 120 reads a texture (surface properties such as color (RGB) and alpha-value) from the texture storage section of the storage section 170 using the texture coordinates set (assigned) to the vertices of the object and the like. The drawing section 120 maps the texture (two-dimensional image) onto the object. In this case, the drawing section 120 performs a pixel-texel link process, a bilinear interpolation process (texel interpolation process), and the like.

The drawing section 120 may perform the hidden surface removal process by a Z-buffer method (depth comparison method or Z-test) using a Z-buffer (depth buffer) that stores the Z-value (depth information) of the drawing pixel. Specifically, the drawing section 120 refers to the Z-value stored in the Z-buffer when drawing the drawing pixel corresponding to the primitive of the object. The drawing section 120 compares the Z-value stored in the Z-buffer with the Z-value of the drawing pixel of the primitive. When the Z-value of the drawing pixel is the Z-value in front of the virtual camera (e.g., a small Z-value), the drawing section 120 draws the drawing pixel and updates the Z-value stored in the Z-buffer with a new Z-value.

The term "alpha-blending" refers to a translucent blending process (e.g., normal alpha-blending, additive alpha-blending, or subtractive alpha-blending) based on the alpha-value (A-value).

Note that the alpha-value is information that can be stored corresponding to each pixel (texel or dot), such as additional information other than the color information. The alpha-value may be used as mask information, translucency (equivalent to transparency or opacity), bump information, or the like.

The sound generation section 130 performs a sound generation process based on the results of various processes performed by the processing section 100 to generate game sound such as background music (BGM), effect sound, or voice, and outputs the generated game sound to the sound output section 192. For example, the sound generation section 130 may output sound data received from the server 20 to the sound output section 192.

2-2. Configuration of Server

Figure 3:
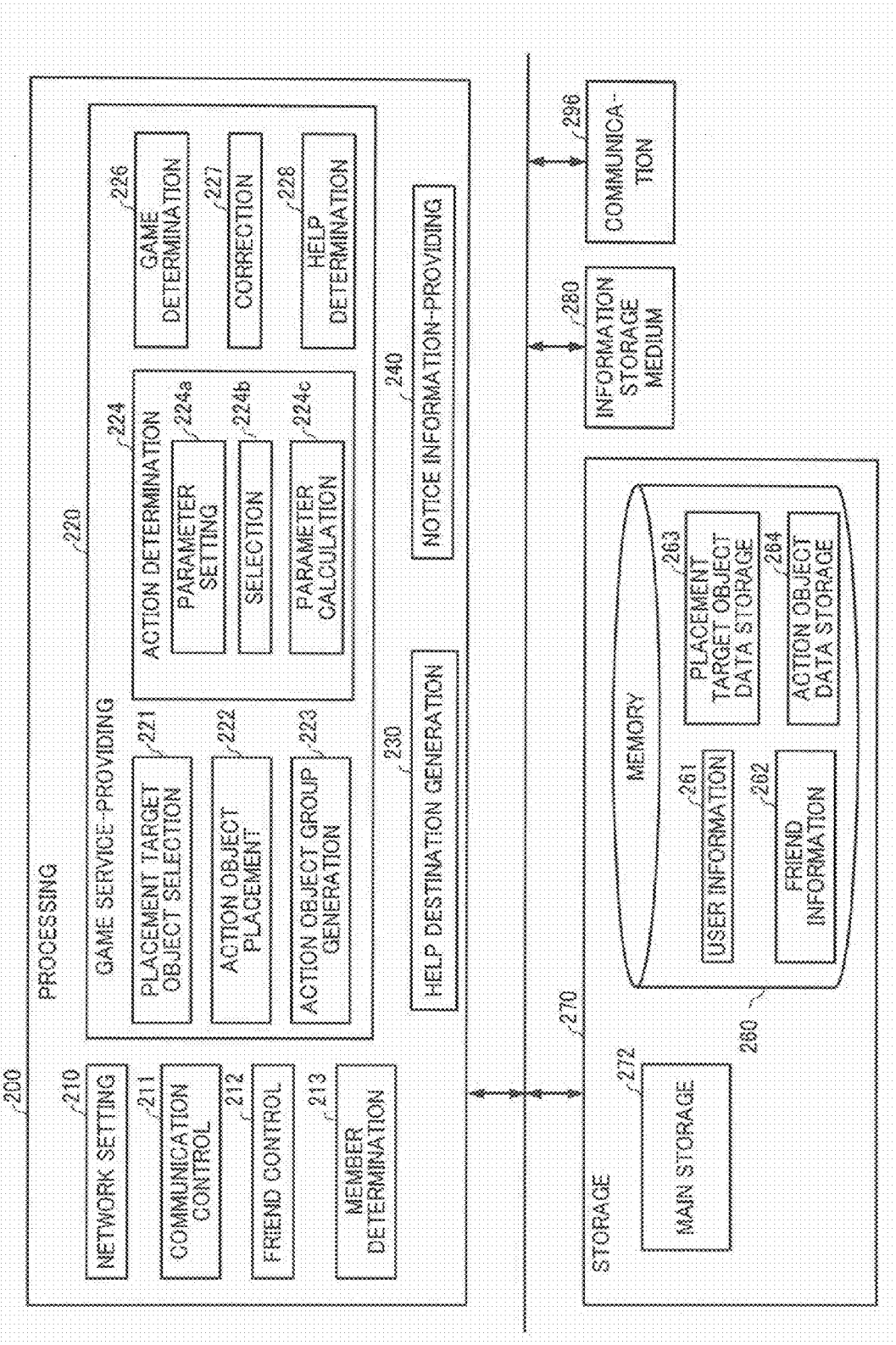
FIG. 3 is a functional block diagram of a server according to one embodiment of the invention.

FIG. 3 illustrates an example of a functional block diagram of the server 20 according to one embodiment of the invention. Note that the server 20 may have a configuration in which some of the elements (sections) illustrated in FIG. 3 are omitted.

A storage section 270 serves as a work area for a processing section 200, a communication section 296, and the like. The function of the storage section 270 may be implemented by a RAM (VRAM) or the like. The storage section 270 includes a memory section 260 (e.g., database).

The memory section 260 stores user information 261 about each user who participates in the network system according to one embodiment of the invention. For example, the memory section 260 stores identification information (user identification number) about each user, a user name (user account), a user password, and the like as the user information 261. Note that the memory section 260 may store destination information (e.g., IP address, e-mail address, port number, MAC address, or telephone number) about the terminal 10, and terminal identification information about the terminal 10 used to access the terminal 10 used by the user, as the user information 261.

The memory section 260 also stores notice information posted by the user and information about an item registered corresponding to the identification information about the user as the user information 261 about the user.

The storage section 270 (memory section 260) stores information that specifies another user who maintains a friend relationship with the user as friend information 262. Specifically, the identification information about one or more users who maintain a friendship with the user is linked to the identification information about the user.

The placement target object data storage section (deck data storage section) 263 stores data about a plurality of placement target objects (decks or circuits) that indicates the placement position where the action object (card) is placed within a predetermined area (nine (3×3) squares). For example, the placement target object data storage section (deck data storage section) 263 stores the number, the placement position, and the execution order of action objects (cards) that can be placed corresponding to each of a plurality of placement target objects.

The placement target object data storage section (deck data storage section) 263 stores image data (object data (e.g., sprite, polygon, and pixel data)) for displaying each placement target object (deck or circuit) on the game screen.

The placement target object data storage section (deck data storage section) 263 stores a plurality of placement target objects that differ in at least one of the number, the placement position, and the execution order of action objects that can be placed.

The placement target object data storage section 263 stores placement position data that indicates a placement position where an action object is placed, and an execution order specified in advance, corresponding to each placement target object.

An action object data storage section (card data storage section) 264 stores data about the action object. For example, the data about the action object is data about a card object.

The action object data storage section 264 stores data linked to a plurality of cards (e.g., CA1, CA2, CA3, . . . ). More specifically, the action object data storage section 264 stores game parameters (basic parameter X and attack capability parameter K (red attack capability parameter KR, blue attack capability parameter KB, and yellow attack capability parameter KY)) and a special parameter KS of each card, and correction values and attributes (colors) of a plurality of specific positional relationships GV1 to GV8. The action object data storage section (card data storage section) 264 may store a plurality of game parameters that differ in attribute (red, blue, and yellow) corresponding to each card.

The action object data storage section (card data storage section) 264 stores image data (e.g., object data (e.g., sprite, polygon, and pixel data)) about each card for displaying each card within a game screen (web page).

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like. The processing section 200 performs various processes according to one embodiment of the invention based on a program (data) stored in the information storage medium 280. Specifically, a program that causes a computer to function as each section according to one embodiment of the invention (i.e., a program that causes a computer to execute the process of each section) is stored in the information storage medium 280.

The communication section 296 performs a control process for communicating with the outside (e.g., terminal, another server, or another network system). The function of the communication section 296 may be implemented by hardware such as a processor or a communication ASIC, a program, or the like.

The processing section 200 (processor) performs a process based on a program stored in the information storage medium 280, and the like. Specifically, the processing section 200 provides a service in response to a request from the terminal.

The processing section 200 performs various processes using a main storage section 272 included in the storage section 270 as a work area. The function of the processing section 200 may be implemented by hardware such as a processor (e.g., CPU or DSP) or an ASIC (e.g., gate array), or a program.

The processing section 200 included in the server 20 includes a network setting section 210, a communication control section 211, a friend control section 212, a member determination section 213, a game service-providing section 220, an help destination generation section 230, and a notice information-providing section 240. Note that the processing section 200 may have a configuration in which some of these sections are omitted.

The network setting section 210 receives terminal (e.g., portable terminal) identification information from the terminal 10, and stores network information about the user in the database 260 so that the network information is linked to the received terminal identification information.

The communication control section 211 exchanges data with the terminal 10 via a network. Specifically, the communication control section 211 transmits information about the user to the terminal 10 based on a request from the terminal of the user. The communication control section 211 transmits information about another user linked to the user to the terminal 10 of the user.

The friend control section 212 registers a plurality of users as maintaining a friend relationship, or cancels the friend relationship between a plurality of users who have been registered as maintaining a friend relationship.

For example, the friend control section 212 links the identification information about a first user to the identification information about a second user, and links the identification information about the second user to the identification information about the first user based on a registration request from the terminal of the first user that requests registration of the second user as a friend, and a registration request from the terminal of the second user that requests registration of the first user as a friend.

The friend control section 212 cancels the friend relationship between a plurality of users who have been registered as maintaining a friend relationship when one of the plurality of users has requested cancellation of the friend relationship.

The member determination section 213 determines whether or not the user of the terminal 10 is a member of a game application based on game play request data when the game play request data has been received from the terminal 10.

The game service-providing section 220 transmits game information about the game application when the game play request data has been received from the terminal 10 of the user who has been determined to be a member of the game application. The game application may be a role-playing game program that proceeds with the game while performing a battle process in the game space using a card. The game information about the game application includes information about a process that transmits a terminal-side game application program processed by the terminal, the execution results of a game application program executed by the server 20, and the like.

The game service-providing section 220 may perform a movement calculation process that moves a character of a first user in the game space based on input information received from the terminal of the first user.

When the game service-providing section 220 has received an access request for the game application (game program) from the terminal 10, the game service-providing section 220 transmits the processing results based on the game program, transmits a game screen (e.g., web page), or transmits a program processed by the terminal.

The following description is given on the assumption that the server 20 performs various processes performed by the game service-providing section 220. Note that some or all of the processes performed by the game service-providing section 220 may be performed by the terminal 10. In this case, the server 20 transmits a program executed by the game service-providing section 220 to the terminal 10.

The game service-providing section 220 includes a placement target object selection section 221, an action object placement section 222, an action object group generation section 223, an action determination section 224, a game determination section 226, a correction section 227, and a help determination section 228.

The placement target object selection section (deck selection section) 221 selects one placement target object from a plurality of placement target objects that indicates the placement position where the action object (card) is placed within a predetermined area (nine (3×3) squares in a virtual two-dimensional space or a virtual three-dimensional space).

For example, the placement target object selection section 221 selects one placement target object from a plurality of placement target objects that differ in at least one of the number of action objects that can be placed, the placement positions of the action objects, and the execution order based on the input information.

The action object disposition section (card disposition section) 222 selects an action object (card) placed at each placement position of the selected placement target object (deck) based on the input information, and places the selected action object on the placement target object selected by the placement target object selection section.

The action object group generation section 223 places a predetermined number of action objects in a predetermined arrangement to generate an action object group. For example, the action object group generation section 223 places nine cards in 3×3 squares (grid) to generate a card group that includes a plurality of cards.

The action determination section 224 determines the action of the character based on the action object (card) that is placed on the placement target object (deck) by the action object placement section 222 and an execution order specified in advance corresponding to the selected placement target object. For example, the action determination section 224 performs an action determination process that causes the battle process to be performed according to the execution order of each card based on a parameter of each card.

The action determination section 224 selects an action object from the action object group based on the input information under predetermined conditions, and determines the action of the character based on the selected action object and the position of the selected action object and/or the execution order of the selected action object. The predetermined conditions may be at least one of a condition whereby the number of action objects is a specific number, a condition whereby two action objects that are consecutively selected (executed) have a first predetermined positional relationship, and a condition whereby the first action object and the last action object to be selected (executed) have a second predetermined positional relationship. For example, the action determination section 224 performs the action determination process that selects a card used for the battle process from nine cards placed in 3×3 squares, and causes the battle process to be performed based on at least one of the position of the selected card and the execution order of the selected card based on a parameter of the selected card.

The action determination section 224 includes a parameter setting section 224a, a selection section 224b, and a parameter calculation section 224c.

The parameter setting section 223 reads a game parameter of each action object (card) placed on the placement target object (deck) of the player character from the action object data storage section (card data storage section) 264, sets a strength parameter of the player character based on the game parameter of each action object, reads a game parameter of each action object placed on the placement target object of the opposing character from the action object data storage section (card data storage section) 264, and sets a strength parameter of the opposing character based on the game parameter of each action object.

For example, the parameter setting section 223 reads a basic parameter of each action object placed on the placement target object of the player character from the action object data storage section (card data storage section) 264, sets the sum of the basic parameters of the action objects to be the strength parameter of the player character, reads a basic parameter of each action object placed on the placement target object of the opposing character from the action object data storage section (card data storage section) 264, and sets the sum of the basic parameters of the action objects to be the strength parameter of the opposing character.

The selection section 224b performs a process that selects the action objects used by the player character during the battle process based on the execution order of the action objects placed on the placement target object of the player character, and a process that selects the action objects used by the opposing character during the battle process based on the execution order of the action objects placed on the placement target object of the opposing character.

For example, the selection section 224b selects the first action object when the last action object among a plurality of action objects placed on the placement target object of the player character has been selected, and selects the first action object when the last action object among a plurality of action objects placed on the placement target object of the opposing character has been selected.

The parameter calculation section 224c performs a parameter calculation process (battle process) that decreases at least one of the strength parameter of the player character and the strength parameter of the opposing character based on the game parameter of the selected action object of the player character and the game parameter of the selected action object of the opposing character.

The parameter calculation section 224c performs a player character special attack process that decreases the strength parameter of the opposing character based on a special parameter when the battle process has been performed based on the last action object among the plurality of action objects placed on the placement target object of the player character, and performs an opposing character special attack process that decreases the strength parameter of the player character based on the special parameter when the battle process has been performed based on the last action object among the plurality of action objects placed on the placement target object of the opposing character.

For example, the parameter calculation section 224c reads an attack capability parameter of the selected action object of the player character and an attack capability parameter of the selected action object of the opposing character from the action object data storage section (card data storage section) 264, and performs a parameter calculation process (battle process) that decreases at least one of the strength parameter of the player character and the strength parameter of the opposing character based on the attack capability parameter of the action object of the player character and the attack capability parameter of the action object of the opposing character.

The parameter calculation section 224c performs the player character special attack process each time the battle process has been performed based on the last action object among the plurality of action objects placed on the placement target object of the player character, and performs the opposing character special attack process each time the battle process has been performed based on the last action object among the plurality of action objects placed on the placement target object of the opposing character.

The parameter calculation section 224c may perform the battle process that decreases at least one of the strength parameter of the player character and the strength parameter of the opposing character based on the game parameter of the selected action object of the player character corresponding to one attribute and the game parameter of the selected action object of the opposing character corresponding to one attribute.

The parameter calculation section 224c may perform the parameter calculation process that changes an event parameter of a game event based on event identification information that is linked to a help destination (i.e., a help address, a cheer address, an aid address) generated in response to a request from a first terminal regardless of whether or not the user of a second terminal is a member of the game application when an access request for the help destination generated in response to the request from the first terminal has been received from the second terminal. In this case, the parameter calculation section 224c may perform the parameter calculation process that changes the event parameter of the game event when it has been determined to help the first user.

The parameter calculation section 224c may perform the parameter calculation process that changes the event parameter of the game event based on the event identification information that is linked to the help destination generated in response to a request from the first terminal when an access request for the help destination generated in response to the request from the first terminal has been received from the second terminal within a predetermined period.

The parameter calculation section 224c may increase a user point parameter of the first user used by the game application when an access request for the help destination generated in response to the request from the first terminal has been received from the second terminal. In this case, the parameter calculation section 224c may decrease the user point parameter of the first user used by the game application when help request data (i.e., cheer request data, aid request data) about a game event executed by the game application has been received.

The parameter calculation section 224c may increase the user point parameter of the second user used by the game process of the game application when an access request for the help destination generated in response to the request from the first terminal has been received from the second terminal, and the user of the second terminal is a member of the game application.

The game determination section 226 performs a win-lose determination process based on the strength parameter of the player character and the strength parameter of the opposing character.

When the battle process is performed based on the (N+1)th action object of the player character, the correction section 227 determines whether or not to correct the game parameter of the (N+1)th action object of the player character based on the positional relationship between the placement position of the Nth action object of the player character placed on the placement target object and the placement position of the (N+1)th action object of the player character placed on the placement target object, and corrects the game parameter of the (N+1)th action object of the player character when it has been determined to correct the game parameter of the (N+1)th action object of the player character.

When the battle process is performed based on the (N+1)th action object of the opposing character, the correction section 227 determines whether or not to correct the game parameter of the (N+1)th action object of the opposing character based on the positional relationship between the placement position of the Nth action object of the opposing character placed on the placement target object and the placement position of the (N+1)th action object of the opposing character placed on the placement target object, and corrects the game parameter of the (N+1)th action object of the opposing character when it has been determined to correct the game parameter of the (N+1)th action object of the opposing character.

When the battle process is performed based on the (N+1)th action object of the player character, the correction section 227 reads specific positional relationship data that specifies the relative positional relationship between two action objects linked to the Nth action object of the player character from the action object data storage section (action object data storage section) 264, and determines whether or not to correct the game parameter of the (N+1)th action object of the player character based on the specific positional relationship data and the positional relationship between the placement position of the Nth action object of the player character placed on the placement target object and the placement position of the (N+1)th action object of the player character placed on the placement target object.

When the battle process is performed based on the (N+1)th action object of the opposing character, the correction section 227 reads specific positional relationship data that specifies the relative positional relationship between two action objects linked to the Nth action object of the opposing character from the action object data storage section (action object data storage section) 264, and determines whether or not to correct the game parameter of the (N+1)th action object of the opposing character based on the specific positional relationship data and the positional relationship between the placement position of the Nth action object of the opposing character placed on the placement target object and the placement position of the (N+1)th action object of the opposing character placed on the placement target object.

When the correction section 227 has determined to correct the game parameter of the (N+1)th action object of the player character, the correction section 227 corrects the game parameter of the (N+1)th action object of the player character based on a correction value corresponding to the positional relationship between the placement position of the Nth action object of the player character placed on the placement target object and the placement position of the (N+1)th action object of the player character placed on the placement target object.

When the correction section 227 has determined to correct the game parameter of the (N+1)th action object of the opposing character, the correction section 227 corrects the game parameter of the (N+1)th action object of the opposing character based on a correction value corresponding to the positional relationship between the placement position of the Nth action object of the opposing character placed on the placement target object and the placement position of the (N+1)th action object of the opposing character placed on the placement target object.

When the battle process is performed based on the (N+1)th action object of the player character, the correction section 227 may correct the game parameter of the (N+1)th action object of the player character corresponding to one of a plurality of attributes based on an attribute corresponding to the Nth action object.

When the battle process is performed based on the (N+1)th action object of the opposing character, the correction section 227 may correct the game parameter of the (N+1)th action object of the opposing character corresponding to one of a plurality of attributes based on an attribute corresponding to the Nth action object.

The help determination section 228 may perform a help determination process that determines whether or not to help the first user based on the game situation of the first user when an access request for the help destination generated in response to the request from the first terminal has been received from the second terminal. For example, the help determination section 228 may perform the help determination process that determines whether or not to help the first user based on the positional relationship between the position of the character of the first user and the event occurrence position of the game event in the game space. For example, the help determination section 228 may determine to help the first user when the distance between the position of the character of the first user and the event occurrence position of the game event is equal to or shorter than a predetermined distance. The help determination section 228 may determine whether or not to help the first user corresponding to the achievement rate of the game event. The help determination section 228 may determine whether or not to help the first user based on a predetermined period that is set based on the time at which the help destination has been generated.

The help destination generation section 230 generates the help destination linked to (corresponding to) the user identification information about the first user and the event identification information about the game event when the help request data about the game event executed by the game application has been received from the first terminal of the first user who has been determined to be a member of the game application.

The notice information-providing section 240 transmits notice information about the first user including the help destination that is linked to the user identification information about the first user to the second terminal when notice information request data about the first user has been received from the second terminal.

3. Process

3-1. Outline

The server according to one embodiment of the invention is connected to the terminal (e.g., computer, smartphone, or portable terminal) via a network, and provides a service that executes a game application in response to a request from the terminal. For example, the server provides a service that executes a role-playing game application that performs a battle process in a game space using an action object (card).

3-2. Member Determination Process

When the server according to one embodiment of the invention has received game play request data from the terminal, the server determines whether or not the user of the terminal is a member of the game application based on the game play request data.

Specifically, when the server has received the game play request data from the terminal, the server determines whether or not the user of the terminal is a member of the game application based on the game play request data, and transmits game information about the game application to the user when the user is a member. The server thus provides the service that executes the game application to only a user who has registered himself as a member.

Figure 4:
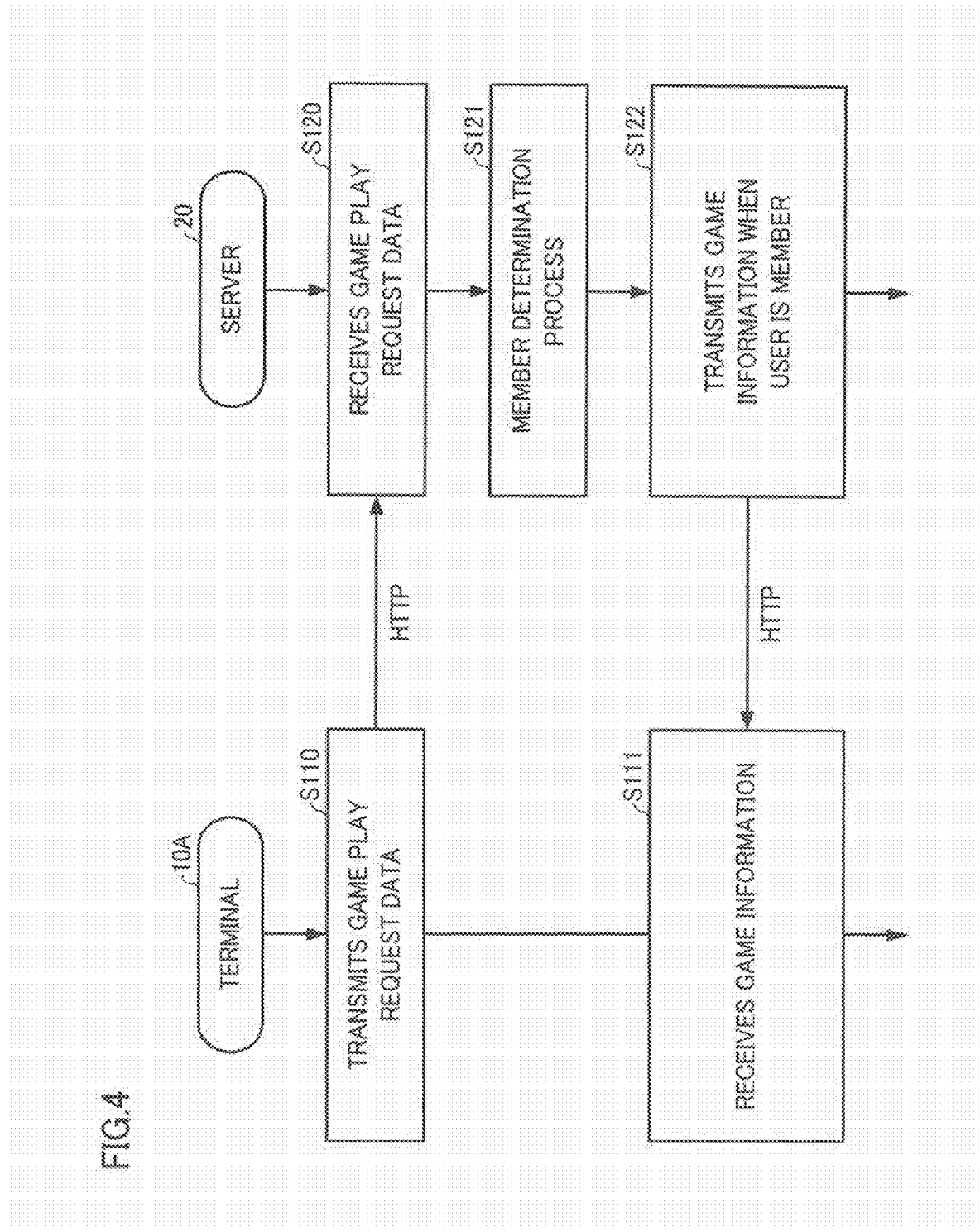
FIG. 4 is a diagram illustrating a member determination process performed by a network system according to one embodiment of the invention.

As illustrated in FIG. 4, a terminal 10A of a user A transmits the game play request data (step S110), and the server 20 receives the game play request data (step S120). The server 20 performs a member determination process based on user identification information included in the game play request data (step S121). The server 20 transmits the game information when the server 20 has determined that the user A is a member (step S122). The terminal 10A receives the game information (step S111), and performs the game process based on the game information. The server 20 transmits user registration request data to the terminal 10A when the server 20 has determined that the user A is not a member. When the terminal 10A has transmitted user information including user identification information to the server 20, the server 20 registers the received user information.

3-3. User Information

Figure 5:
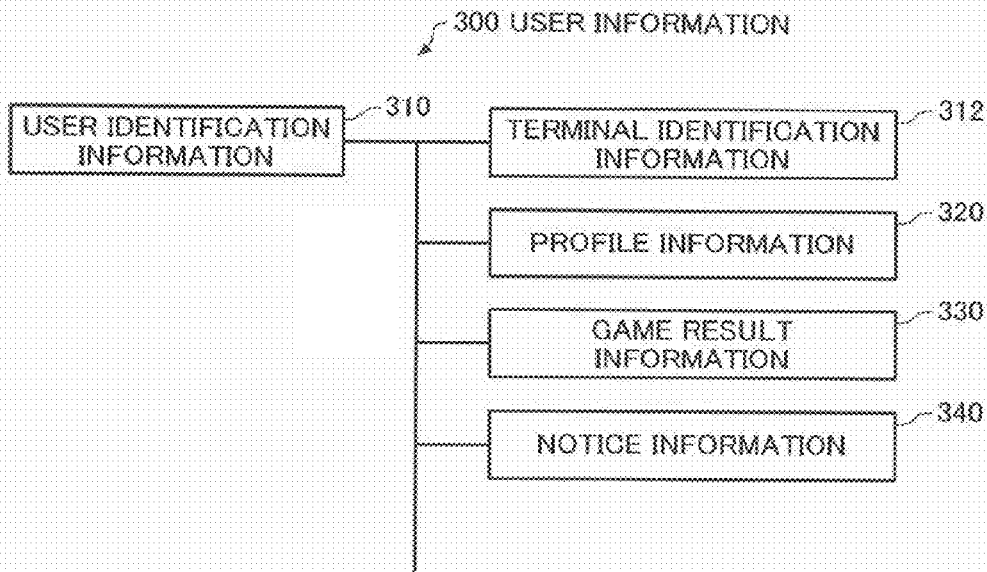
FIG. 5 is a diagram illustrating user information according to one embodiment of the invention.

FIG. 5 is a diagram illustrating the user information.

User information 300 includes user identification information 310 and various types of information linked to the user identification information 310. In one embodiment of the invention, the user information 300 includes terminal identification information 312, profile information 320, game result information 330, message notice information 340, and the like as the information linked to the user identification information 310.

The user identification information 310 may be an ID assigned to each user, or a game ID registered by the user. The terminal identification information 312 is an ID assigned to the terminal 10. The terminal identification information 312 may be used as the user identification information.

The profile information 320 is generated and registered based on a profile that is input by the user when the user registers himself as a member. For example, the profile information 320 includes information about the user account (user name), password, nickname, sex, age (date of birth), address (prefecture), self-introduction, and the like.

The game result information 330 is game result information about each user. For example, the game result information 330 includes information about a strength parameter of a user character operated by the user, a level of the user character, a user point parameter (action points or cooperation points), and the like.

Figure 6:
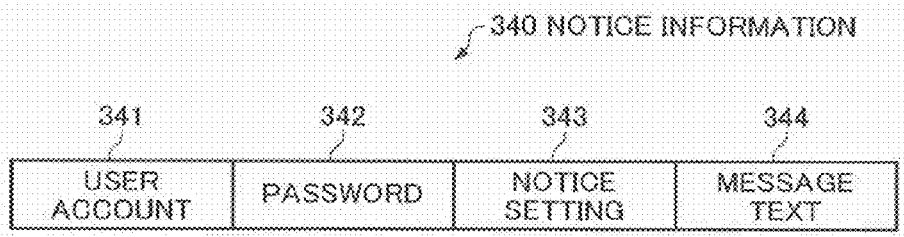
FIG. 6 illustrates message notice information according to one embodiment of the invention.

FIG. 6 illustrates an example of the notice information (message information). As illustrated in FIG. 6, the notice information 340 includes information about a user account 341 and a password 342 of an SNS server (notice site or posting site) that performs a notice information-providing process, a notice setting 343 (e.g., notice conditions (notice timing) and message customization), a message text 344 (e.g., message text when the message is customized and help destination), and the like.

The SNS server (notice site or posting site) that performs the notice information-providing process stores the notice information in the storage section based on the user account 341 and the password 342 so that the notice information is linked to the user identification information. The SNS server transmits the notice information to the terminal of the user based on an access request from the terminal.

The server 20 may function as the SNS server that performs the notice information-providing process. Specifically, when the server 20 has received notice information request data about the user A from the terminal 10A, the server 20 transmits the notice information about the user A to the terminal 10A. When the server 20 has received the notice information request data about the user A from the terminal 10B, the server 20 transmits the notice information about the user A to the terminal 10B under predetermined conditions.

3-4. Game Service-Providing Process

In the network system according to one embodiment of the invention, the server 20 performs a game service-providing process that provides a service to the terminal, the service providing a role-playing game to the terminal.

The role-playing game according to one embodiment of the invention is configured so that a battle process is performed on a player character operated by the player and an opposing character (e.g., enemy character or another character operated via another terminal) using an action object (card). For example, a deck and the action object (card) are set based on the input information input using the terminal, and the battle process is performed on the player character and the opposing character based on a game parameter corresponding to the action object (card), an execution order that is set in advance to a placement target object (deck), a placement position, and the like. The details are described below.

3-4-1. Deck Setting Process

In one embodiment of the invention, a deck (i.e., placement target object) used during a battle is set based on the input information input by the player. For example, one deck is selected based on the input information, deck data corresponding to the selected deck is read from the placement target object data storage section (deck data storage section) 263 that stores a plurality of pieces of deck data that specifies the placement position and the order of each card that can be placed, and the deck of the player character is set based on the deck data read from the placement target object data storage section 263.

Figure 7A:
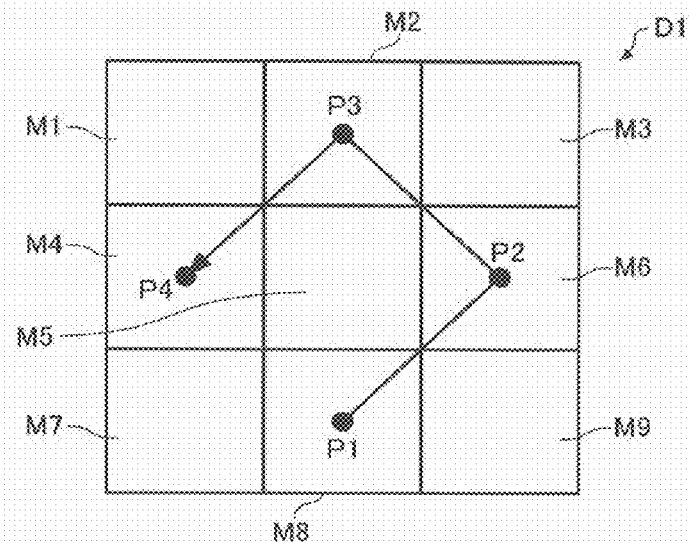
FIGS. 7A to 7C are diagrams illustrating a deck according to one embodiment of the invention.

The term "deck" used herein refers to a card deck (circuit) (i.e., placement target object) for placing a card in the game space. As illustrated in FIG. 7A, the deck may be a card deck for placing a card in at least one of nine (3×3) squares M1 to M9 (i.e., predetermined areas), for example.

A deck D1 illustrated in FIG. 7A indicates that four cards can be placed. A card placed at a placement position P1 (square M8), a card placed at a placement position P2 (square M6), a card placed at a placement position P3 (square M2), and a card placed at a placement position P4 (square M4) are selected in this order.

Figure 7B:
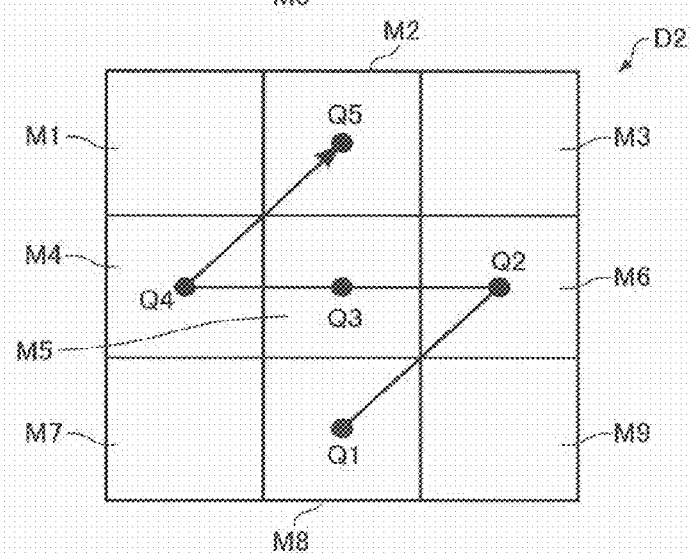

A deck D2 illustrated in FIG. 7B indicates that five cards can be placed. A card placed at a placement position Q1 (square M8), a card placed at a placement position Q2 (square M6), a card placed at a placement position Q3 (square M5), a card placed at a placement position Q4 (square M4), and a card placed at a placement position Q5 (square M2) are selected in this order.

Figure 7C:
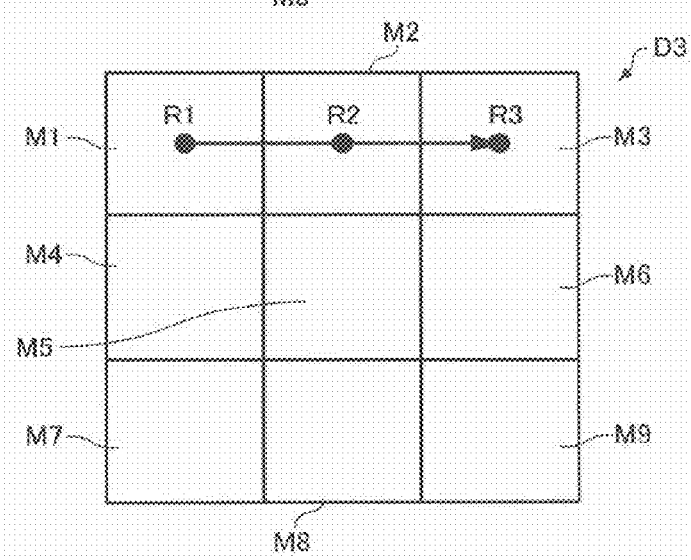

A deck D3 illustrated in FIG. 7C indicates that three cards can be placed. A card placed at a placement position R1

(square M0, a card placed at a placement position R2 (square M2), and a card placed at a placement position R3 (square M3) are selected in this order.

The placement target object data storage section (deck data storage section) 263 of the memory section 260 of the server storage section 270 stores data (data about a plurality of placement target objects) about a plurality of decks that differ in at least one of the number of cards that can be placed, the placement position, and the placement order (e.g., the decks D1 to D3 illustrated in FIGS. 7A to 7C).

The server 20 selects one deck from a plurality of decks based on the input information (deck selection information) received from the terminal 10, and sets the selected deck to be the deck of the player character (user character) operated by the player A (user A).

3-4-2. Card Setting Process

In one embodiment of the invention, a card used during a battle is set based on the input information input by the player. Specifically, a card that is placed at each placement position of the selected deck of the player character is selected based on the input information, and the selected card is set at the corresponding placement position of the deck of the player character.

The term "card" used herein refers to a display object (i.e., action object) in the game space that indicates data that changes the progress of the game. In one embodiment of the invention, a card is disposed on the deck in the game space, and used for the battle process performed on the player character and the opposing character.

FIG. 8 illustrates cards CA1 to CA6. As illustrated in FIG. 9, parameters are set (linked) to each card. Specifically, a basic parameter X (i.e., game parameter) and an attack capability parameter K (i.e., game parameter) are set (linked) to each card. In one embodiment of the invention, the attack capability parameter K is classified into a red attack capability parameter KR, a blue attack capability parameter KB, and a yellow attack capability parameter KY.

The server 20 selects a card that is placed on the deck of the player character from a plurality of cards based on the input information (card selection information) received from the terminal 10.

For example, when the deck D1 is used as the deck of the player character, the server 20 selects four cards placed at the placement positions P1 to P4 from the action object data storage section (card data storage section) 264 based on the card selection information received from the terminal 10.

Figure 10:
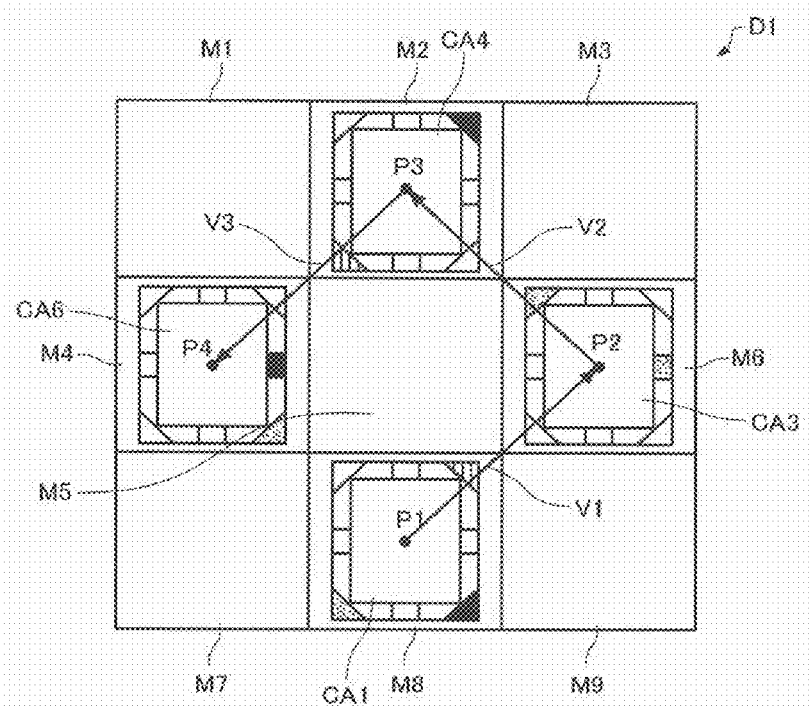
FIG. 10 is a diagram illustrating a battle process according to one embodiment of the invention.

As illustrated in FIG. 10, when the card CA1 has been selected as the card placed at the placement position P1 (square M8) of the deck D1, the server 20 places the card CA1 at the placement position P1 (square M8). Likewise, the server 20 places the cards CA3, CA4, and CA6 respectively at the placement positions P2, P3, and P4 of the deck D1.

Figure 11:
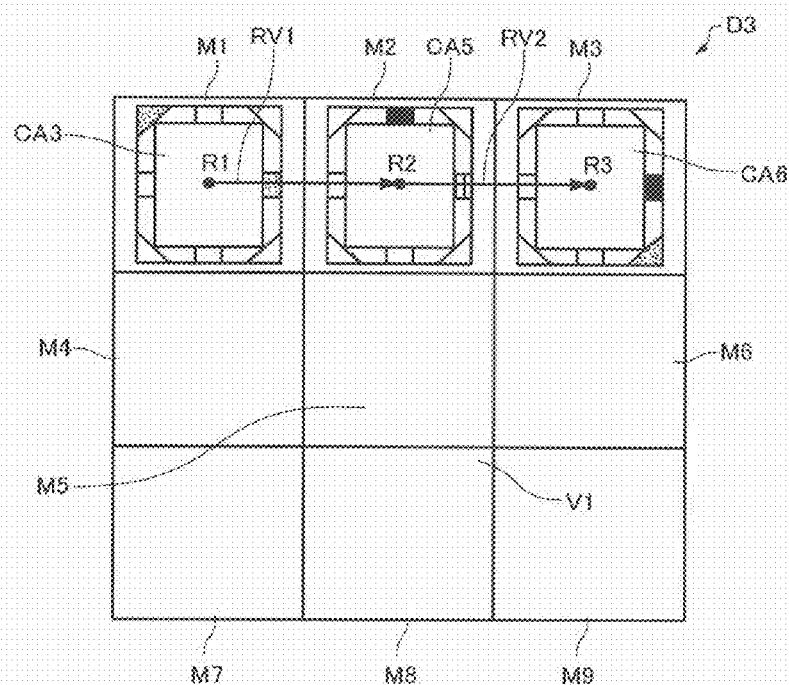
FIG. 11 is a diagram illustrating a battle process according to one embodiment of the invention.

FIG. 11 illustrates an example in which the deck D3 has been selected as the deck of the opposing character. As illustrated in FIG. 11, the cards CA3, CA5, and CA6 are respectively placed at the placement positions P1, P2, and P3 of the deck D3.

3-5. Battle Process

3-5-1. Outline of Battle Process

In one embodiment of the invention, the battle process is performed based on each card placed on the deck of the player character and each card placed on the deck of the opposing character. The opposing character may be a character operated by the player (user) of another terminal, or may be a computer player.

3-5-2. Character Strength Parameter Setting

In one embodiment of the invention, the game parameters of each card placed on the deck of the player character are read from the action object data storage section (card data storage section) 264, and the strength parameter of the player character is set based on the game parameters of each card. The game parameters of each card placed on the deck of the opposing character are read from the action object data storage section (card data storage section) 264, and the strength parameter of the opposing character is set based on the game parameters of each card.

For example, the basic parameter of each card placed on the deck of the player character is read from the action object data storage section (card data storage section) 264, and the sum of the basic parameters of the cards is set as the strength parameter of the player character. The basic parameter of each card placed on the deck of the opposing character is read from the action object data storage section (card data storage section) 264, and the sum of the basic parameters of the cards is set as the strength parameter of the opposing character. Specifically, the strength parameter increases as the number of cards that can be placed on the deck increases.

As illustrated in FIG. 10, the strength parameter (LP1) of the player character is the sum (=550) of the basic parameter X (=100) of the card CA1, the basic parameter X (=100) of the card CA3, the basic parameter X (=150) of the card CA4, and the basic parameter X (=200) of the card CA6 placed on the deck D1.

As illustrated in FIG. 11, the strength parameter (LP2) of the opposing character is the sum (=450) of the basic parameter X (=100) of the card CA3, the basic parameter X (=150) of the card CA5, and the basic parameter X (=200) of the card CA6 placed on the deck D3.

3-5-3. Card Selection Process

In one embodiment of the invention, the server 20 performs a process that selects the cards placed on the deck of the player character and used by the player character during the battle process in the placement order, and a process that selects the cards placed on the deck of the opposing character and used by the opposing character during the battle process in the placement order.

As illustrated in FIG. 10, when the cards CA1, CA3, CA4, and CA6 are set on the deck D1 of the player character in this order, the cards CA1, CA3, CA4, and CA6 are selected in this order, and used by the player character during the battle process. As illustrated in FIG. 11, when the cards CA3, CA5, and CA6 are set on the deck D3 of the opposing character in this order, the cards CA3, CA5, and CA6 are selected in this order, and used by the opposing character during the battle process.

As illustrated in FIG. 10, an arrow (direction) (e.g., V1, V2, and V3) that indicates the next card may be displayed on the game screen so that the order (execution order) of the cards can be easily determined.

3-5-4. Parameter Calculation Process

In one embodiment of the invention, the server 20 performs a parameter calculation process (battle process) that decreases at least one of the strength parameter of the player character and the strength parameter of the opposing character based on the game parameter of the selected card of the player character and the game parameter of the selected card of the opposing character.

For example, the attack capability parameter K of the selected card CA1 of the player character and the attack capability parameter K of the selected card CA3 of the opposing character are read from the action object data storage section (card data storage section) 264. The parameter calculation process (battle process) that decreases at least one of the strength parameter of the player character and the strength parameter of the opposing character is performed based on the attack capability parameter K of the card CA1 of the player character and the attack capability parameter K of the card CA3 of the opposing character.

The game parameter (attack capability parameter) is set to each card corresponding to each attribute. The term "attribute" used herein refers to a type. In one embodiment of the invention, three colors (red, blue, yellow) are used as the attributes.

Specifically, the attack capability parameter K of each card is classified into the red attack capability parameter KR, the blue attack capability parameter KB, and the yellow attack capability parameter KY. For example, the red attack capability parameter KR of the card CA1 is set to "10", the blue attack capability parameter KB of the card CA1 is set to "30", and the yellow attack capability parameter KY of the card CA1 is set to "20".

The parameter calculation process (battle process) that decreases at least one of the strength parameter of the player character and the strength parameter of the opposing character is performed based on one of the attack capability parameters KR, KB, and KY of the card of the player character and one of the attack capability parameters KR, KB, and KY of the card of the opposing character.

For example, the blue attack capability parameter KB among the attack capability parameters KR, KB, and KY of the first card CA1 placed on the deck D1 of the player character is larger than the attack capability parameters KR and KY. The battle process is performed using the attribute (blue) corresponding to the maximum value when the player character attacks the opposing character. Specifically, a value (30−20=10) obtained by subtracting the blue attack capability parameter KB (=20) of the first card CA3 placed on the deck D3 of the opposing character from the blue attack capability parameter KB (=30) of the player character is subtracted from the strength parameter LP2 of the opposing character. When a negative value is obtained by subtracting the attack capability parameter of the opposing character from the attack capability parameter of the player character, the value is corrected to zero.

The yellow attack capability parameter KY among the attack capability parameters KR, KB, and KY of the first card CA3 placed on the deck D3 of the opposing character is larger than the attack capability parameters KR and KB. Therefore, when the opposing character attacks the player character, a value (30−20=10) obtained by subtracting the yellow attack capability parameter KY (=20) of the first card CA1 placed on the deck D1 of the player character from the yellow attack capability parameter KY (=30) of the opposing character is subtracted from the strength parameter LP1 of the player character.

The first battle process thus includes an attack process using the first card placed on the deck D1 of the player character and an attack process using the first card placed on the deck D3 of the opposing character.

The second battle process includes an attack process using the second card placed on the deck D1 of the player character and an attack process using the second card placed on the deck D3 of the opposing character.

The third battle process includes an attack process using the third card placed on the deck D1 of the player character and an attack process using the third card placed on the deck D3 of the opposing character.

The fourth battle process includes an attack process using the fourth card placed on the deck D1 of the player character and an attack process using the first card placed on the deck D3 of the opposing character. Specifically, the card CA3 is selected again when the last card CA6 among the plurality of cards placed on the deck D3 of the opposing character has been selected (i.e., the three cards placed on the deck D3 are repeatedly used).

The fifth battle process includes an attack process using the first card placed on the deck D1 of the player character and an attack process using the second card placed on the deck D3 of the opposing character. Specifically, the card CA1 is selected again when the last card CA6 among the plurality of cards placed on the deck D1 of the player character has been selected (i.e., the four cards placed on the deck D1 are repeatedly used).

3-5-5. Parameter Calculation Process Based on Special Parameter

In one embodiment of the invention, the server 20 performs a player character special attack process that subtracts a special parameter from the strength parameter of the opposing character when the battle process has been performed based on the last card among the plurality of cards placed on the deck of the player character, and an opposing character special attack process that subtracts a special parameter from the strength parameter of the player character when the battle process has been performed based on the last card among the plurality of cards placed on the deck of the opposing character. Specifically, a special technique is used when all of the cards placed on the deck have been used.

More specifically, the player character special attack process that subtracts the special parameter (e.g., "100") from the strength parameter LP2 of the opposing character is performed each time the battle process has been performed based on the last card CA6 among the plurality of cards placed on the deck D1 of the player character. The opposing character special attack process that subtracts the special parameter (e.g., "100") from the strength parameter LP1 of the player character is performed each time the battle process has been performed based on the last card CA6 among the plurality of cards placed on the deck D3 of the opposing character.

The special parameter may be a predetermined value (e.g., "100"), or may be a value linked to each card (e.g., the special parameter KS of the card CA6 is "60" in FIG. 9). The special parameter may be randomly determined when the special attack process is performed.

3-5-6. Game Determination Process

In one embodiment of the invention, a win-lose determination process is performed based on the strength parameter LP1 of the player character and the strength parameter LP2 of the opposing character.

A character whose strength parameter (LP1 or LP2) has reached a predetermined value (e.g., "0") before the strength parameter of the other character reaches the predetermined value is determined to have lost the battle, and the other character is determined to have won the battle. The game determination process (win-lose determination process) is performed each time the strength parameters LP1 and LP2 are updated by the parameter calculation process. Note that the game may be determined to have ended in a draw when the game time has exceeded a predetermined time limit, or the battle count has exceeded a predetermined number.

According to one embodiment of the invention, the player selects the deck, cards, and the like in order to win a battle taking account of the basic parameter of each card and the special attack process. This makes it possible for the player to enjoy selecting the deck and the cards, so that the game playability can be improved.

3-6. Correction Process

In one embodiment of the invention, when the battle process is performed based on the (N+1)th card of the player character, whether or not to correct the game parameter of the (N+1)th card of the player character may be determined based on the positional relationship between the placement position of the Nth card of the player character placed on the deck and the placement position of the (N+1)th card of the player character placed on the deck, and the game parameter of the (N+1)th card of the player character may be corrected when it has been determined to correct the game parameter of the (N+1)th card of the player character. Specifically, it is determined to correct the game parameter of the (N+1)th card of the player character when the placement position of the Nth card of the player character placed on the deck and the placement position of the (N+1)th card of the player character placed on the deck have a predetermined positional relationship. This makes it possible to allow the player to enjoy setting the deck taking account of the placement position, the placement order, and the like of the cards.

For example, the attack capability parameter K of the second card CA3 of the player character is increased when the direction V1 indicated by the positional relationship between the placement position P1 of the first card of the player character placed on the deck D1 and the placement position P2 of the second card of the player character placed on the deck D1 indicates a predetermined positional relationship GV1 (see FIG. 10).

Note that the correction process may also be performed on the opposing character. Specifically, when the battle process is performed based on the (N+1)th card of the opposing character, whether or not to correct the game parameter of the (N+1)th card of the opposing character may be determined based on the positional relationship between the placement position of the Nth card of the opposing character placed on the deck and the placement position of the (N+1)th card of the opposing character placed on the deck, and the game parameter of the (N+1)th card of the opposing character may be corrected when it has been determined to correct the game parameter of the (N+1)th card of the opposing character.

3-6-1. Specific Positional Relationship

In one embodiment of the invention, specific positional relationship data that specifies the relative positional relationship between two cards linked to the Nth card of the player character may be read from the action object data storage section (card data storage section) 264, and whether or not to correct the game parameter of the (N+1)th card of the player character may be determined based on the specific positional relationship data and the positional relationship between the placement position of the Nth card of the player character placed on the deck and the placement position of the (N+1)th card of the player character placed on the deck. According to this feature, since the specific positional relationship data that specifies the relative positional relationship between two cards affects the correction determination process, the player can enjoy setting the cards taking account of the specific positional relationship data.

The specific positional relationship data that specifies the relative positional relationship between two cards is described below with reference to FIG. 12A.

For example, the server specifies directions GV1, GV2, GV3, GV4, GV5, GV6, GV7, and GV8 of positions (squares) G1, G2, G3, G4, G5, G6, G7, and G8 of other cards relative to a position G0 (see FIG. 12A), and stores data corresponding to the directions GV1 to GV8 in the card data storage section as the specific positional relationship data.

As illustrated in FIG. 12B, the specific positional relationship data includes a correction value and an attribute (red, blue, and yellow), for example. Specifically, the correction value of the card CA1 corresponding to the direction GV1 is "3", and the attribute of the card CA1 corresponding to the direction GV1 is "yellow". The correction value of the card CA1 corresponding to the direction GV3 is "2", and the attribute of the card CA1 corresponding to the direction GV3 is "blue". The correction value of the card CA1 corresponding to the direction GV5 is "3", and the attribute of the card CA1 corresponding to the direction GV5 is "red". The correction values of the card CA1 corresponding to the directions GV2, GV4, GV6, GV7, and GV8 are "0 (NULL)", and the attributes of the card CA1 corresponding to the directions GV2, GV4, GV6, GV7, and GV8 are "none (NULL)".

As illustrated in FIG. 12C, areas F1 to F8 corresponding to the directions GV1 to GV8 may be provided to the card displayed on the game screen, and the correction value and the attribute (color) may be displayed in each area. For example, since the correction value "3" and the attribute "Yellow" are set corresponding to the direction GV1 of the card CA1, the area F1 corresponding to the direction GV1 is displayed in yellow, and a value "3" is displayed in the area F1. An area corresponding to a direction for which the correction value and the attribute are not set is displayed in a ground color (e.g., white).

When the correction value of the first card CA1 corresponding to the direction GV1 (e.g., the same direction as the direction V1) corresponding to the direction V1 determined based on the positional relationship between the placement position P1 of the first card CA1 of the player character on the deck D1 and the placement position P2 of the second card CA3 of the player character on the deck D1 is larger than a predetermined value (correction value >0), it is determined to correct the attack capability parameter K of the second card CA3. It is determined not to correct the attack capability parameter K of the second card CA3 when the correction value is equal to or smaller than the predetermined value (smaller than 0).

The correction process is performed as follows when it has been determined to correct the attack capability parameter K of the second card CA3 of the player character.

For example, the attack capability parameter K of the second card CA3 is corrected based on the correction value corresponding to the positional relationship between the placement position P1 of the first card CA1 of the player character on the deck and the placement position P2 of the second card CA3 of the player character on the deck (e.g., correction value "3" corresponding to the same direction as the direction V1). For example, the correction value "3" corresponding to the direction GV1 is added to the attack capability parameter K of the second card CA3.

Figure 13A:
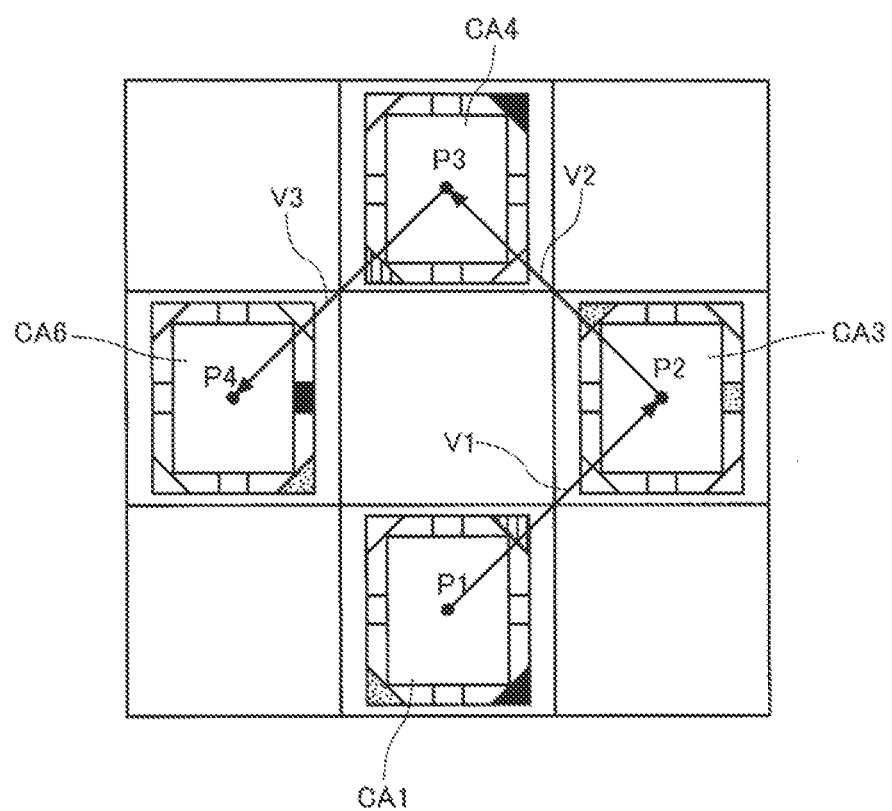
FIGS. 13A and 13B are a diagram and a flowchart, respectively, illustrating a correction process according to one embodiment of the invention.
Figure 13B:
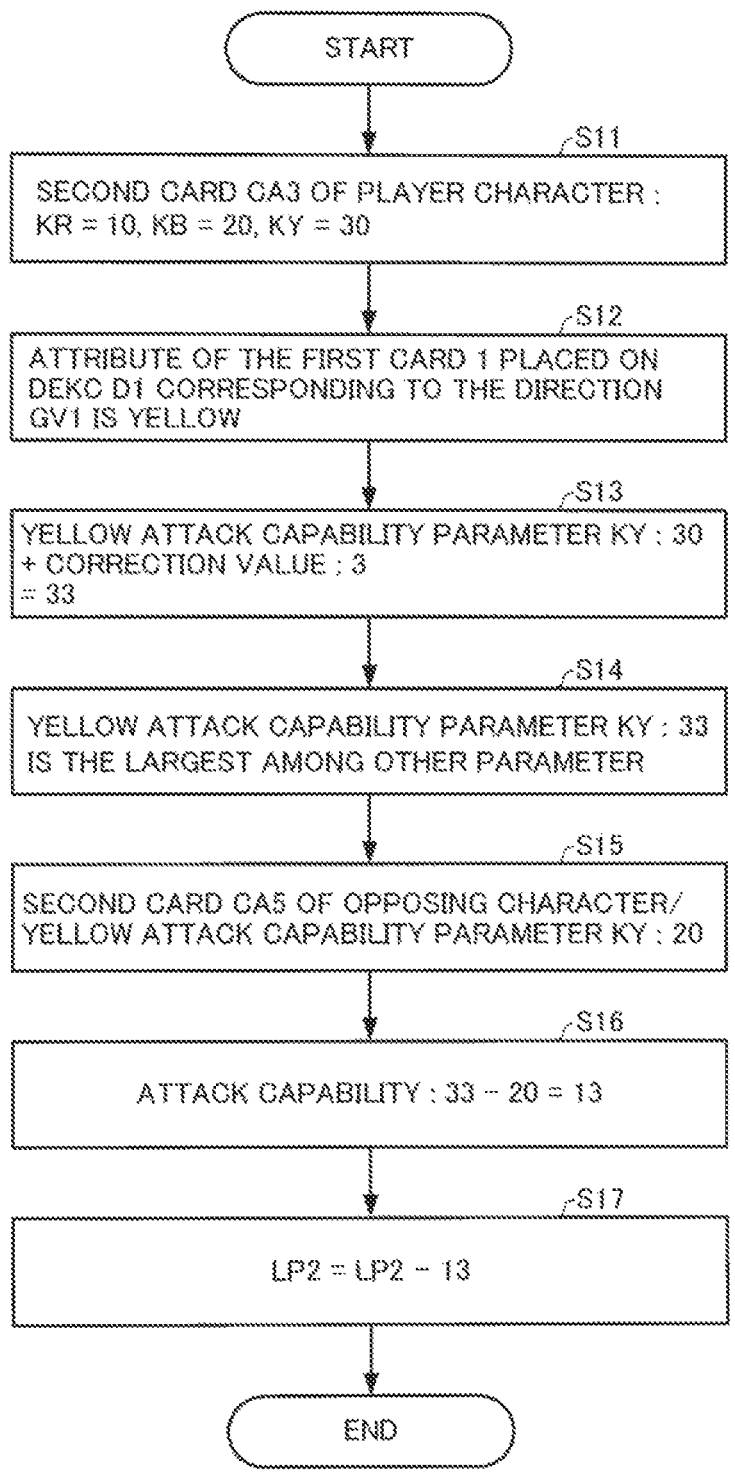

In one embodiment of the invention, since the attack process is performed taking account of the attribute, the correction process may be performed based on the attribute. For example, when the attribute of the first card CA1 of the player character placed on the deck D1 corresponding to the direction GV1 is yellow (see FIG. 12C), the yellow attack capability parameter KY of the second card CA3 is corrected as illustrated in FIGS. 13A and 13B. Specifically, the correction value "3" is added to the attack capability parameter KY. For example, when the yellow attack capability parameter KY of the second card CA3 is "30", the yellow attack capability parameter KY is corrected to "33", and the attack process is performed based on the corrected value (S11 to S13 of FIG. 13B).

Further, the yellow attack capability parameter KY among the attack capability parameters KR, KB, and KY of the second card CA3 placed on the deck D1 of the player character is larger than the attack capability parameters KR and KB. Therefore, when the player character attacks the opposing character, a value (33−20=13) obtained by subtracting the yellow attack capability parameter KY (=20) of the second card CA5 placed on the deck D3 of the opposing character from a value obtained by adding the correction value to the yellow attack capability parameter KY (=30) of the player character is subtracted from the strength parameter LP2 of the opposing character. Specifically, the strength parameter LP2 of the opposing character is updated with a value obtained by subtracting "13" from the strength parameter LP2 (S14 to S17 of FIG. 13B).

Note that the correction process may also be performed on the opposing character. Specifically, the specific positional relationship data that specifies the relative positional relationship between two cards linked to the Nth card of the opposing character may be read from the action object data storage section (card data storage section) 264, and whether or not to correct the game parameter of the (N+1)th card of the opposing character may be determined based on the specific positional relationship data and the positional relationship between the placement position of the Nth card of the opposing character placed on the deck and the placement position of the (N+1)th card of the opposing character placed on the deck.

For example, it is determined to correct the attack capability parameter K of the second card CA5 of the opposing character since the correction value ("3") set corresponding to the direction GV2 (e.g., the same direction as the direction RV1) corresponding to the direction RV1 set based on the positional relationship between the placement position R1 of the first card CA3 of the opposing character on the deck D3 and the placement position R2 of the second card CA5 of the opposing character on the deck D3 is larger than a predetermined value.

When it has been determined to correct the attack capability parameter K of the second card CA5 of the opposing character, the attack capability parameter K of the second card CA5 is corrected based on the correction value of the first card CA3 (e.g., the correction value "3" corresponding to the same direction as the direction RV1) corresponding to the positional relationship between the placement position R1 of the first card CA3 of the opposing character on the deck and the placement position R2 of the second card CA5 of the opposing character on the deck. For example, the correction value "3" corresponding to the direction GV2 is added to the attack capability parameter K of the second card CA5.

Figure 14A:
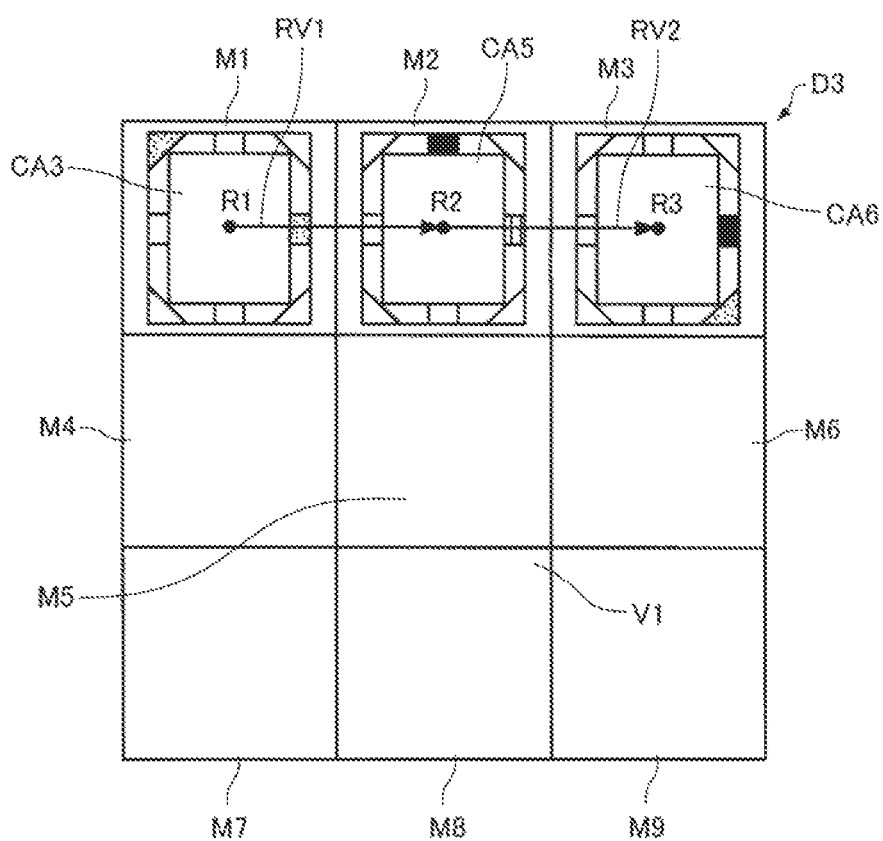
FIGS. 14A and 14B are a diagram and a flowchart, respectively, illustrating a correction process according to one embodiment of the invention.
Figure 14B:
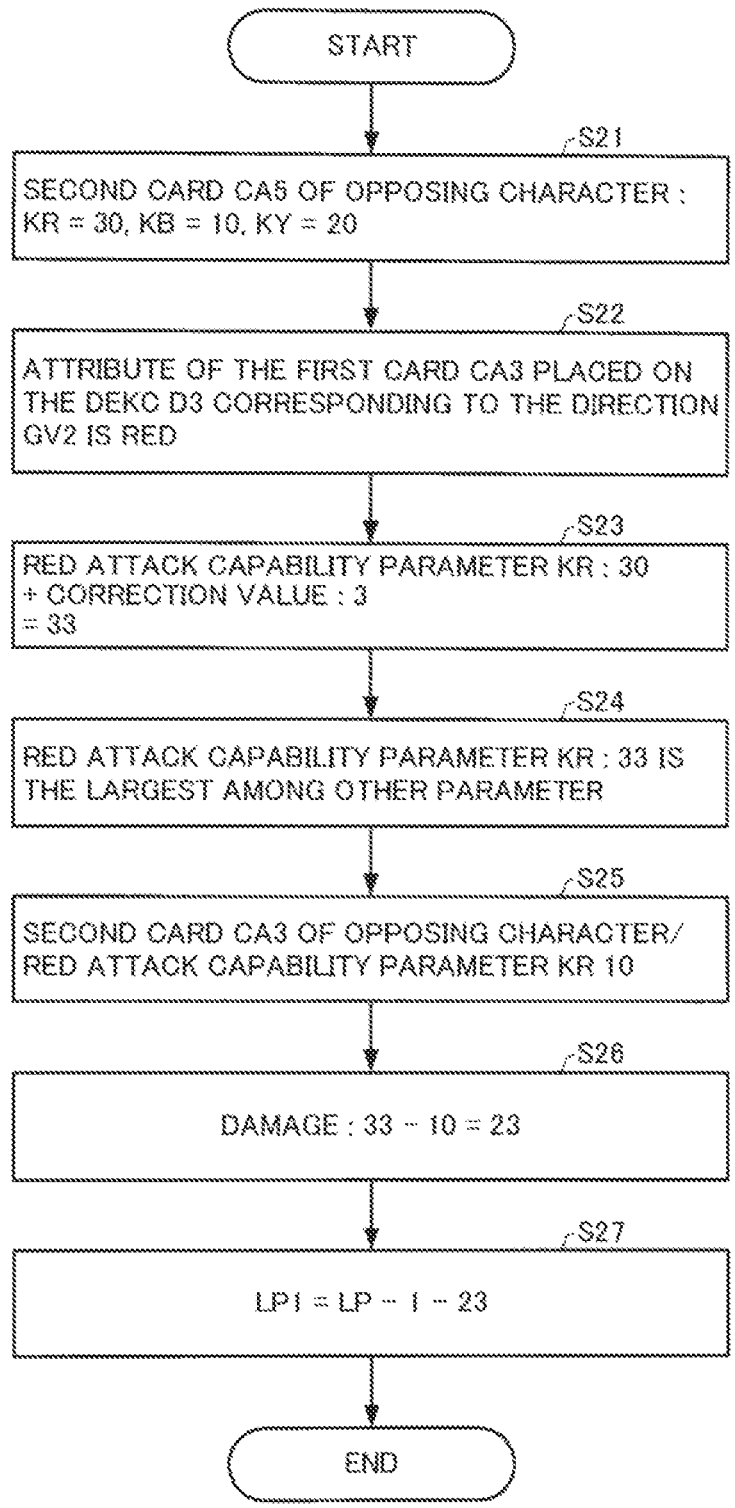

For example, when the attribute of the first card CA3 of the opposing character placed on the deck D3 corresponding to the direction GV2 is red, and the correction value is "3" (see FIG. 12C), the red attack capability parameter KR of the second card CA5 is corrected as illustrated in FIGS. 14A and 14B. Specifically, the correction value "3" is added to the attack capability parameter KR. For example, when the red attack capability parameter KR of the second card CA5 is "30", the red attack capability parameter KR is corrected to "33", and the attack process is performed based on the corrected (S21 to S23 of FIG. 14B).

Further, the red attack capability parameter KR among the attack capability parameters KR, KB, and KY of the second card CA5 placed on the deck D3 of the opposing character is larger than the attack capability parameters KB and KY. Therefore, when the opposing character attacks the player character, a value (33−10=23) obtained by subtracting the red attack capability parameter KR (=10) of the second card CA3 placed on the deck D1 of the player character from the red attack capability parameter KR (=30) of the opposing character is subtracted from the strength parameter LP1 of the player character. Specifically, the strength parameter LP1 of the player character is updated with a value obtained by subtracting "23" from the strength parameter LP1 (S24 to S27 of FIG. 14B).

The above correction process allows the player to set the deck and the cards taking account of the attribute, the correction value, and the specific positional relationship. This makes it possible to provide a game with improved strategic characteristics.

3-6-2. Other

The game parameter (e.g., basic parameter X and attack capability parameter K) set to each card may be increased when a predetermined correction condition has been satisfied.

The game parameter (e.g., basic parameter X and attack capability parameter K) may be increased based on an item (equipment) set to the player character. For example, when an item "sword" is set to the player character, an item parameter "sword" (e.g., "20") may be added to the basic parameter X and the attack capability parameter K.

When the battle process has been performed based on the last card among the plurality of cards placed on the deck, whether or not to correct the game parameter of the first card may be determined based on the specific positional relationship data about the last card and the positional relationship between the placement position of the first card and the placement position of the last card.

In the example illustrated in FIGS. 13A and 13B, the game parameter of the card CA1 may be corrected based on the correction value ("3") or the attribute (red) of the card CA6 corresponding to the direction GV3 that is identical with the direction from the position P4 to the position P1.

In the example illustrated in FIGS. 14A and 14B, the game parameter of the card CA3 may be corrected based on the correction value ("2") or the attribute (blue) of the card CA6 corresponding to the direction GV2 that is identical with a direction determined based on the positional relationship between the position R1 and the position R3 (e.g., the direction from the position R1 to the position R3).

3-7. Formation of Group

In one embodiment of the invention, a group (party) may be formed by a plurality of characters, and the battle process may be performed on each group formed by a plurality of characters. For example, the player character may be moved to a group formation area (adventurer's guild) in the game space, and another character that is added to a player group including the player character may be selected based on the input information input by the player.

As illustrated in FIG. 15, when forming a group (party) that includes a player character CH1 operated by a first player, the characters CH1, CH2, CH3, and CH4 that form a first group are controlled based on input information input by the first player (input information transmitted from the terminal of the first player), for example.

When forming a group (party) that includes a player character CH2 operated by a second player, the characters CH1, CH2, CH3, and CH4 that form a second group are controlled based on input information input by the second player (input information transmitted from the terminal of the second player). The battle process can be performed on the character CH1 that forms the second group independently of the character CH1 that forms the first group. For example, the first player may lend a ghost of the character CH1 to the second group so that the experience value acquired by the character CH1 that forms the second group is added to the experience value of the player character CH1 that forms the first group.

3-7-1. Group Battle Process

In one embodiment of the invention, a group (party) may be formed by a plurality of characters, and the battle process may be performed on the group formed by a plurality of characters and the opposing character (enemy character), or may be performed on a plurality of groups formed by a plurality of characters.

For example, when the battle process may be performed on a plurality of groups, a deck may be set to each character that forms each group, and cards may be placed on the deck of each character.

Specifically, decks D1, D2, D3, and D4 are respectively selected for the player characters CH1, CH2, CH3, and CH4 that form the first group (player group), and a card placed at each placement position of each deck is set based on the input information input by the first player (input information transmitted from the terminal of the first player).

Figure 16:
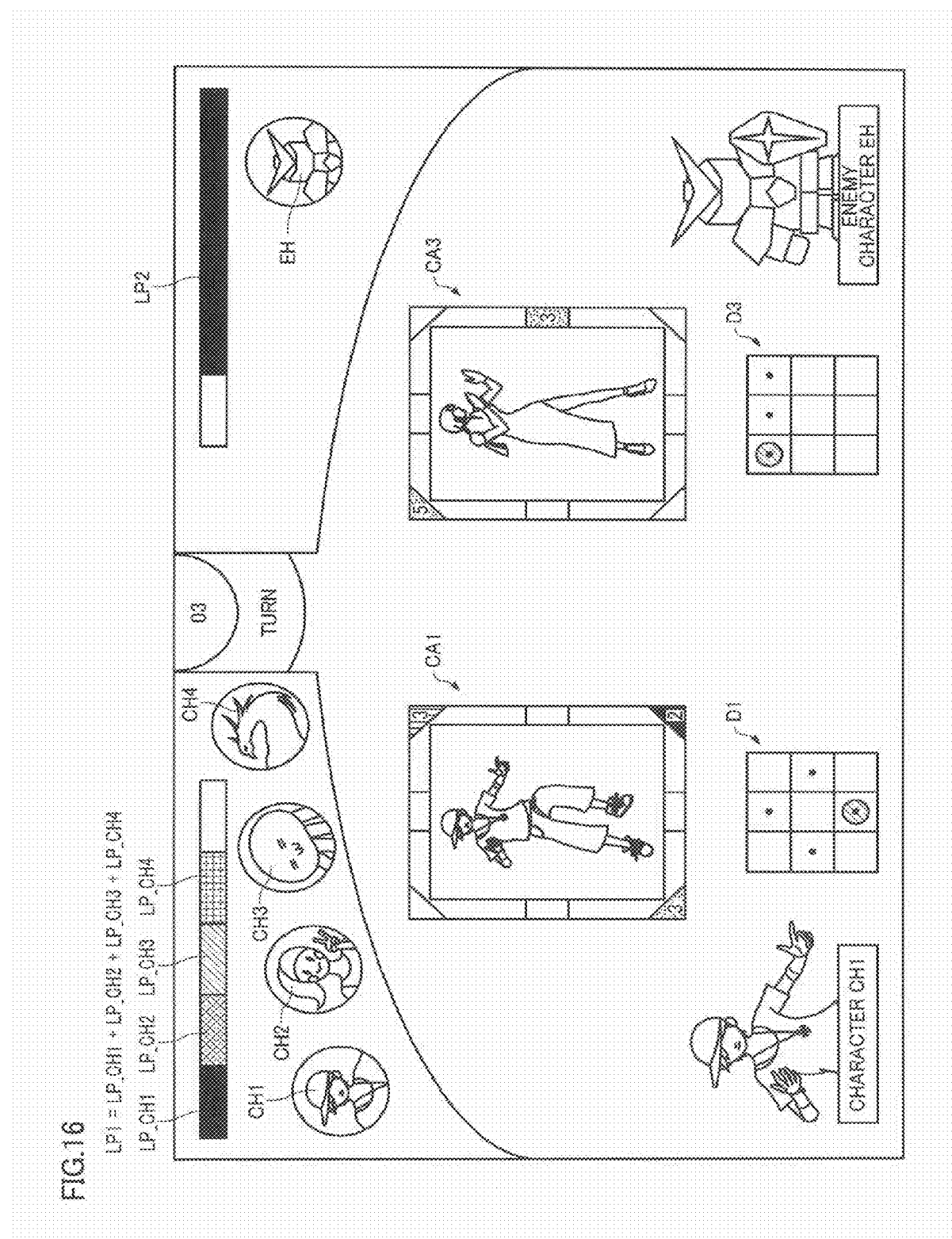
FIG. 16 is a diagram illustrating a game screen according to one embodiment of the invention.

FIG. 16 illustrates an example of a screen displayed on the display section of the terminal when the battle process is performed on the characters CH1 to CH4 that form the first group and an enemy character EH. The members of the player group are displayed in the upper left area of the screen, and strength parameters LP_CH1, LP_CH2, LP_CH3, and LP_CH4 (gauges) of the characters CH1, CH2, CH3, and CH4 are displayed.

The sum of the strength parameters LP_CH1, LP_CH2, LP_CH3, and LP_CH4 is set to be the strength parameter LP1 of the first group.

The battle process is performed until the strength parameter LP1 of the first group or the strength parameter LP2 of the enemy character reaches a predetermined value (0).

An example in which the characters CH4, CH3, CH2, and CH1 attack the enemy character in this order is described below. The characters are selected in the attack order. Specifically, the character CH4 is selected. The first card placed on the deck D4 of the character CH4 is then selected, and the largest attack capability parameter among the attack capability parameters KR, KB, and KY (red, blue, and yellow) of the first card is subtracted from the strength parameter LP2 of the enemy character EH.

The first card placed on the deck D3 of the character CH3 is then selected, and the largest attack capability parameter among the attack capability parameters KR, KB, and KY (red, blue, and yellow) of the first card is subtracted from the strength parameter LP2 of the enemy character EH.

The first card placed on the deck D2 of the character CH2 is then selected, and the largest attack capability parameter among the attack capability parameters KR, KB, and KY (red, blue, and yellow) of the first card is subtracted from the strength parameter LP2 of the enemy character EH.

The first card placed on the deck D1 of the character CH1 is then selected, and the largest attack capability parameter among the attack capability parameters KR, KB, and KY (red, blue, and yellow) of the first card is subtracted from the strength parameter LP2 of the enemy character EH.

When the attack process using the player group has ended, the attack process is performed using the enemy character EH. Specifically, the enemy character EH attacks the character CH4 that forms the player group. The first card placed on the deck D3 of the enemy character EH is selected, and the largest attack capability parameter among the attack capability parameters KR, KB, and KY (red, blue, and yellow) of the first card is subtracted from the strength parameter LP_CH4 of the character CH4. When the strength parameter LP_CH4 of the character CH4 has decreased, the strength parameter LP1 of the player group decreases.

The first (first-turn) battle process ends when the attack process using the enemy character EH has ended, and the next battle process is performed. Specifically, the next card of each character that forms the player group is selected, and the next card of the enemy character EH is selected.

More specifically, the second card placed on the deck D4 of the character CH4 is selected, and the largest attack capability parameter among the attack capability parameters KR, KB, and KY (red, blue, and yellow) of the second card is subtracted from the strength parameter LP2 of the enemy character EH.

The second card placed on the deck D3 of the character CH3 is then selected, and the largest attack capability parameter among the attack capability parameters KR, KB, and KY (red, blue, and yellow) of the second card is subtracted from the strength parameter LP2 of the enemy character EH.

The second card placed on the deck D2 of the character CH2 is then selected, and the largest attack capability parameter among the attack capability parameters KR, KB, and KY (red, blue, and yellow) of the second card is subtracted from the strength parameter LP2 of the enemy character EH.

The second card placed on the deck D1 of the character CH1 is then selected, and the largest attack capability parameter among the attack capability parameters KR, KB, and KY (red, blue, and yellow) of the second card is subtracted from the strength parameter LP2 of the enemy character EH.

When the attack process using the player group has ended, the attack process is performed using the enemy character EH. Specifically, the enemy character EH attacks the character CH4 that forms the player group. The second card placed on the deck D3 of the enemy character EH is selected, and the largest attack capability parameter among the attack capability parameters KR, KB, and KY (red, blue, and yellow) of the second card is subtracted from the strength parameter LP_CH4 of the character CH4.

When the strength parameter LP_CH4 of the character CH4 has reached "0" due to the attack process using the enemy character EH, the remaining value is subtracted from the strength parameter LP_CH3 of the character CH3.

The battle process is repeated in this manner. The player group or the enemy character EH whose strength parameter (LP1 or LP2) has reached a predetermined value (e.g., "0") before the strength parameter of the other reaches the predetermined value is determined to have lost the battle, and the other is determined to have won the battle.

Note that the attack order using the characters that form the player group may be determined based on the input information from the terminal of the player.

When the battle process is performed on a plurality of groups, it is possible to allow the player to enjoy strategically determining the deck and the card corresponding to the attack order using each character. For example, the player can enjoy strategically setting a deck on which a large number of cards can be placed corresponding to the first character that attacks the enemy character, and setting a deck on which a small number of cards can be placed corresponding to the last character that attacks the enemy character. In this case, the first character can sufficiently defend against an attack by the enemy character EH, and the special attack process is likely to occur when using the last character.

3-8. Game Screen

In one embodiment of the invention, the game screen as illustrated in FIG. 16 is displayed on the display section of the terminal during the battle process. For example, the game screen displayed during the battle process is transmitted from the server 20 to the terminal 10 as web content data, and the terminal 10 displays the received web content data.

As illustrated in FIG. 16, the strength parameter LP1 of the player character, the strength parameter LP2 of the opposing character, the cards CA1 and CA3 used for the battle process, the deck D1 of the player character, and the deck D3 of the opposing character are displayed within the game screen. Note that the placement position of the card used for the battle process may be displayed to be shiny.

The server may transmit a deck selection screen and a card selection screen to the terminal as content data that is displayed on the terminal. For example, the terminal may display the decks D1 to D3 (see FIG. 7) so that the player can select one deck corresponding to each character. The terminal may display the cards CA1 to CA6 (see FIG. 8) so that the player can select each card placed on the deck.

3-9. Progress of Game 3-9-1. Action Point

In one embodiment of the invention, the server performs a calculation process that moves the player character in the game space based on the input information received from the terminal of the player (user).

For example, action points AP (i.e., user point parameter) are set to the player character, and the player character is moved by utilizing (consuming) the action points AP.

Figure 17:
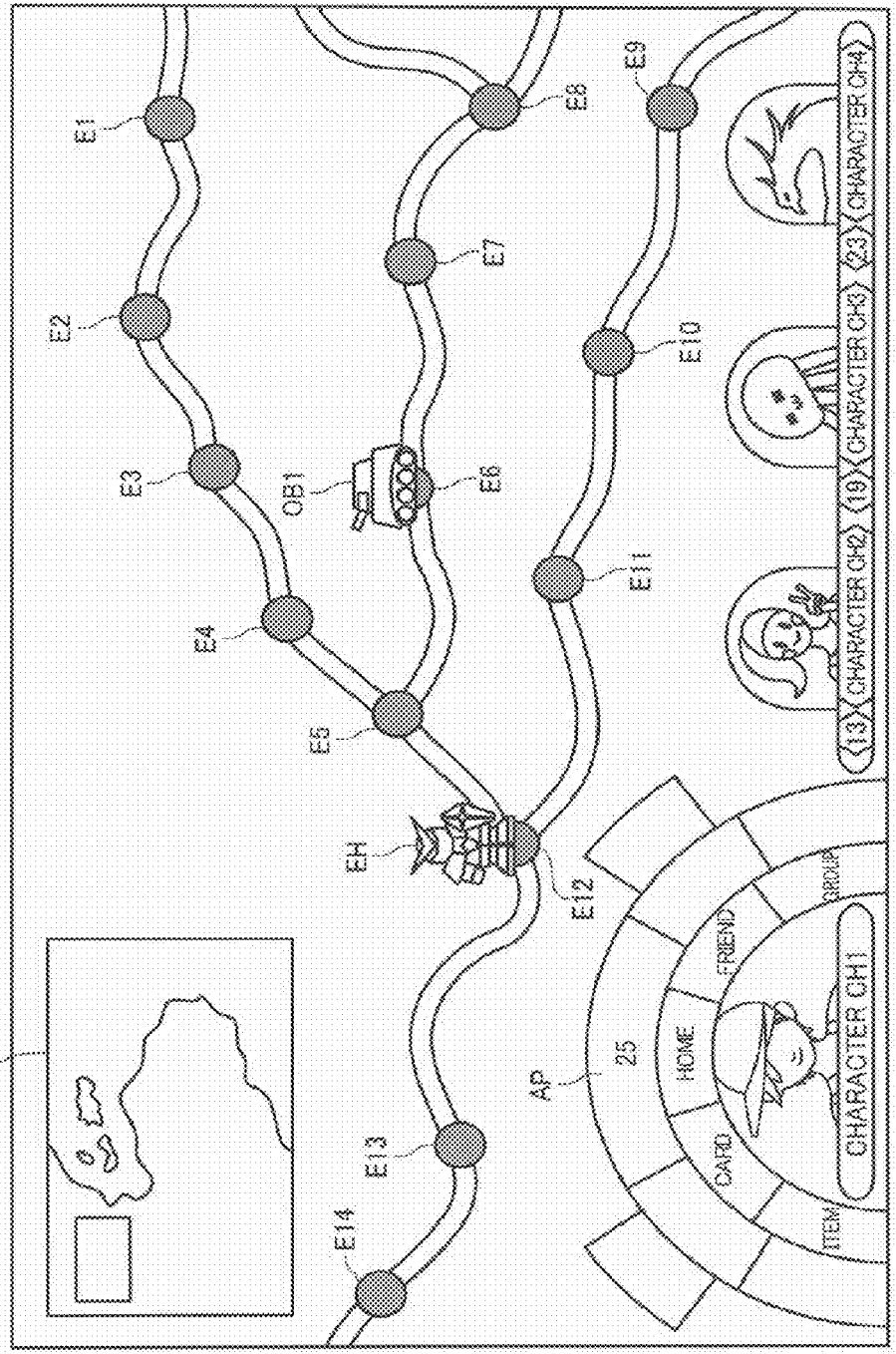
FIG. 17 is a diagram illustrating a game space according to one embodiment of the invention.

In FIG. 17, the position of the player character CH1 is displayed using a moving object OB1, and the player character CH1 (moving object OB1) is located at a position E6 in the game space. When moving the player character CH1 (moving object OB1), the moving object OB1 is moved to the adjacent position by consuming (subtracting) one action point AP of the player character. For example, the player character CH1 (moving object OB1) can be moved from the position E6 to the position E5 or E7 by consuming one action point AP.

When moving the player character CH1 (moving object OB1) to the position E12 of the enemy character EH, "2" is subtracted from the action points of the player character.

The action points AP may be increased with the passage of time. For example, the action points AP may be increased by one when 1 minute has elapsed.

3-9-2. Game Event

In one embodiment of the invention, the server performs a game event execution process that generates a game event (quest) based on event request input information (i.e., an event request transmitted from the terminal of the player), and determines whether or not the game event (quest) has succeeded.

For example, when a game event EV1 that requires the player character to defeat the enemy character EH within a predetermined period (e.g., within 24 hour from the time when the game event has been generated) has been generated, it is determined that the game event EV1 has succeeded when the strength parameter LP2 of the enemy character EH has reached a predetermined value ("0"), and it is determined that the game event EV1 has failed when the strength parameter LP2 of the enemy character EH has not reached the predetermined value ("0").

Note that whether or not a game event has succeeded may be determined based on a plurality of characters accessed by a plurality of terminals.

For example, when a game event EV1 that requires the player character to defeat the enemy character EH within a predetermined period (e.g., within 24 hour from the time when the game event has been generated) has been generated, the character of each player may be moved to the position (event occurrence position) E12 of the enemy character EH, and caused to attack the enemy character EH, and the strength parameter LP2 of the enemy character EH may be decreased.

For example, a state in which the strength parameter LP2 of the enemy character decreases (i.e., the game event EV1 is achieved) may be transmitted to the terminal in real time so that the player can observe the decrease in the strength parameter LP2 of the enemy character.

The game process may be changed when an event has not been achieved.

Figure 18:
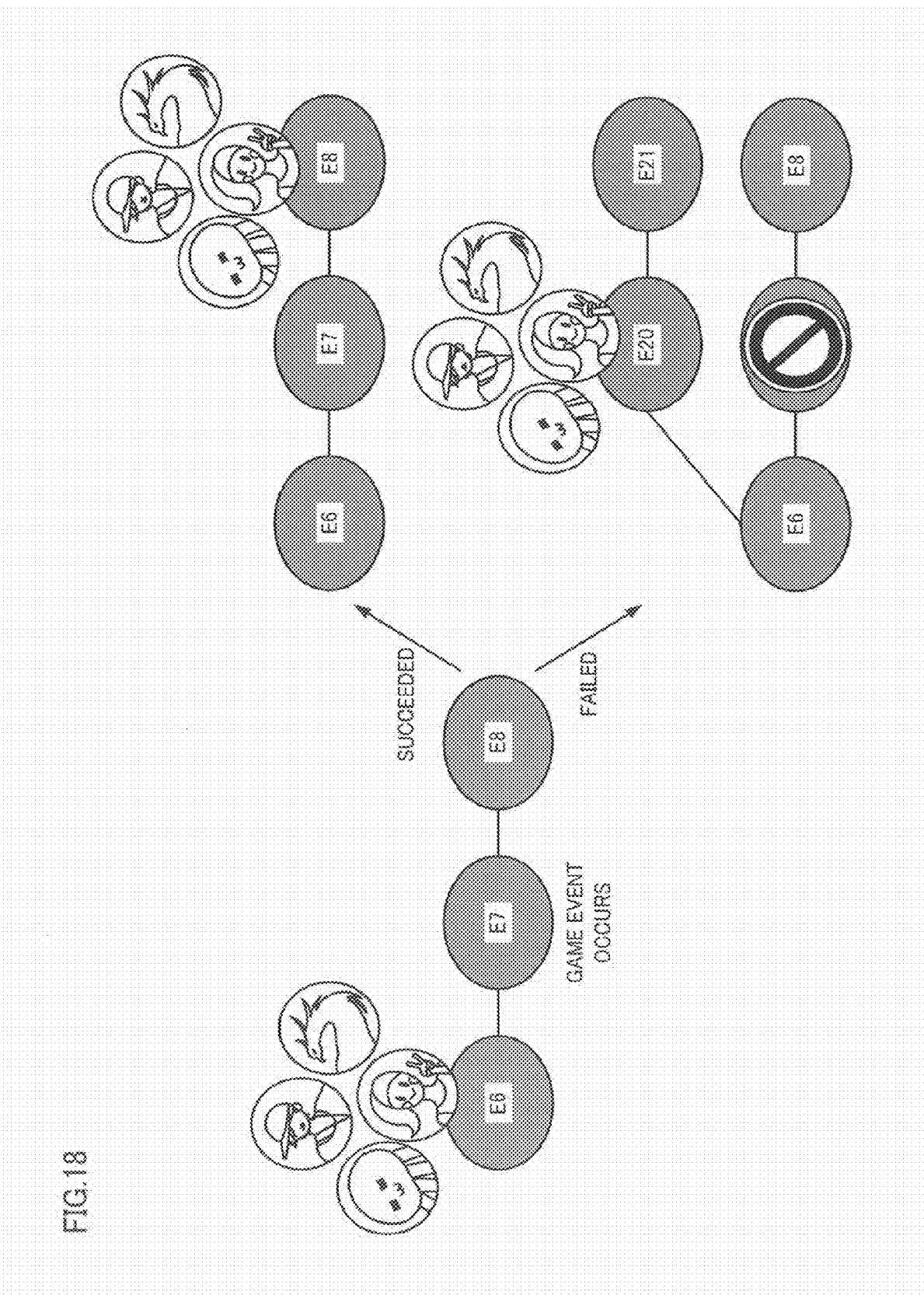
FIG. 18 is a diagram illustrating an event process according to one embodiment of the invention.

In FIG. 18, an event occurs at a point E7 in the game space, for example. When the event has succeeded, each character can move to a point E8. When the event has failed, each character cannot move to the points E7 and E8. In this case, another path (course) that leads to points E20 and E21 is caused to appear, and the character is moved along the other path in the game space. Specifically, the characters that participate in the game cannot move to the points E7 and E8 without succeeding in the event in cooperation. This makes it possible to motivate each player to proceed with the game in cooperation.

3-9-3. Card and Deck

In one embodiment of the invention, the number of cards or decks may be increased corresponding to the progress of the game played by the user.

3-10. Flowchart

The flow of the battle process according to one embodiment of the invention that utilizes the card is described below with reference to FIGS. 19A and 19B.

Figure 19A:
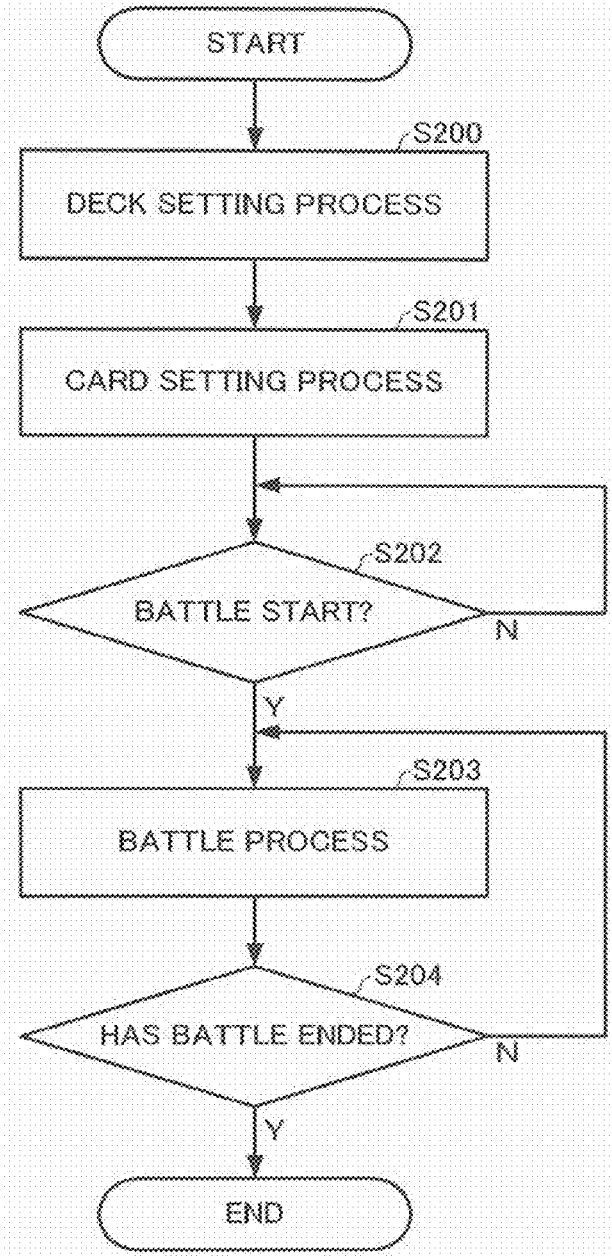
FIG. 19A is a flowchart illustrating a battle process according to one embodiment of the invention.

As illustrated in FIG. 19A, the deck setting process is performed (step S200). For example, one deck is selected based on the input information from the terminal of the player, the deck data corresponding to the selected deck is read from the placement target object data storage section (deck data storage section) 263, and the deck of the player character is set based on the deck data read from the placement target object data storage section (deck data storage section) 263.

The card setting process is then performed (step S201). For example, a card that is placed at each placement position of the selected deck of the player character is selected based on the input information from the terminal of the player, and the selected card is set at the corresponding placement position of the deck of the player character.

Next, whether or not the player starts a battle is determined (step S202). When the player starts a battle (Y in step S202), the battle process is performed (step S203). For example, the battle process is performed when the player character (moving object OB1) has been moved to the position of the enemy character.

Whether or not the battle process has ended is determined (step S204). When the battle process has ended (Y in step S204), the process ends. For example, the player character or the opposing character whose strength parameter has reached "0" before the strength parameter of the other character reaches "0" is determined to have lost the battle, and the other character is determined to have won the battle.

The details of the battle process are described below with reference to FIG. 19B.

The strength parameter setting process is performed (step S300). For example, the game parameters of each card placed on the deck of the player character are read from the action object data storage section (card data storage section) 264, and the strength parameter of the player character is set based on the game parameters of each card. The game parameters of each card placed on the deck of the opposing character are also read from the action object data storage section (card data storage section) 264, and the strength parameter of the opposing character is set based on the game parameters of each card.

The card selection process is then performed (step S301). For example, the server performs the process that selects the cards placed on the deck of the player character and used by the player character during the battle process in the placement order, and the process that selects the cards placed on the deck of the opposing character and used by the opposing character during the battle process in the placement order.

Next, the correction process is performed (step S302). For example, when the attack process is performed based on the (N+1)th card of the player character, whether or not to correct the game parameter of the (N+1)th card of the player character is determined based on the positional relationship between the placement position of the Nth card of the player character placed on the deck and the placement position of the (N+1)th card of the player character placed on the deck, and the game parameter of the (N+1)th card of the player character is corrected when it has been determined to correct the game parameter of the (N+1)th card of the player character.

When the attack process is performed based on the (N+1)th card of the opposing character, whether or not to correct the game parameter of the (N+1)th card of the opposing character is determined based on the positional relationship between the placement position of the Nth card of the opposing character placed on the deck and the placement position of the (N+1)th card of the opposing character placed on the deck, and the game parameter of the (N+1)th card of the opposing character is corrected when it has been determined to correct the game parameter of the (N+1)th card of the opposing character.

The attack capability parameter of the card of the player character is subtracted from the strength parameter of the opposing character, and the attack capability parameter of the opposing character is subtracted from the strength parameter of the player character (step S303).

Next, whether or not the selected card of the player character is the last card is determined (step S304).

When the selected card of the player character is the last card (Y in step S304), the special parameter is subtracted from the strength parameter of the opposing character (step S305). When the selected card of the player character is not the last card (N in step S304), the process transitions to a step S306.

In the step S306, whether or not the selected card of the opposing character is the last card is determined.

When the selected card of the opposing character is the last card (Y in step S306), the special parameter is subtracted from the strength parameter of the player character (step S307). The process then transitions to the step S301. When the selected card of the opposing character is not the last card (N in step S306), the process transitions to the step S301. The process is thus completed.

4. Help Process (i.e., Cheer Process or Aid Process)

4-1. Outline of Help Process

In one embodiment of the invention, the server may control the game process so that the terminal can request help (i.e., cheer or aid) from another terminal via a network. For example, the server 20 incorporates a help URL (i.e., help link, help destination, help address, cheer address or aid address) in the blog or web page (e.g., SNS user page) of the user A (player). Therefore, when another user (viewer) (e.g., user B) who has viewed the blog or the SNS user page of the user A desires to help the user A, the other user can help (i.e., cheer or aid) the user A in the game by clicking the help URL.

In FIG. 20, when the game event EV1 that requires the player character to defeat the enemy character EH within a predetermined period (e.g., within 24 hour from the time when the game event has been generated) has been generated, it is determined that the game event EV1 has succeeded when the strength parameter LP2 of the enemy character EH has reached a predetermined value ("0"), and it is determined that the game event EV1 has failed when the strength parameter LP2 of the enemy character EH has not reached the predetermined value ("0"). When the game event EV1 has failed, the player character cannot move to the points E7 and E8.

For example, the strength parameter LP2 of the enemy character EH in the game event EV1 is decremented by one each time the help URL has been clicked (i.e., the strength parameter LP2 of the enemy character decreases more quickly due to help).

Therefore, the user A can easily achieve the game event EV1 via help. The strength parameter LP2 decreases when another user has clicked the help URL regardless of whether or not the other user is a member of the game application. Therefore, a viewer who is not a member of the game application does not hesitate to help another user (i.e., can help another user by a simple operation). Moreover, it is possible to prompt (motivate) a viewer who is not a member of the game application to become a member of the game application.

4-2. Help Request Process

When the server 20 has received help request data about the game event EV1 that is executed by the game application from the terminal 10A of the user A who has been determined to be a member of the game application, the server 20 generates a help destination (help URL) J1 that is linked to user identification information (e.g., "1") about the user A and event identification information (e.g., "1") about the game event EV1, for example.

Figure 21A:
FIGS. 21A to 21C illustrate a help destination according to one embodiment of the invention.
Figure 21B:
Figure 21C:

FIGS. 21A to 21C illustrate examples of the help URL. For example, the help URL includes the scheme name (http), the host name (or the IP address) of the server that provides the game application, the path name (that may include the directory name), the value of the event identification information, and the value of the user identification information in this order. Specifically, a URL that includes data about the event identification information and the user identification information is generated.

FIG. 21A illustrates a help URL (J1) in which the event identification information is "1" and the user identification information is "1". FIG. 21B illustrates a help URL (J2) in which the event identification information is "2" and the user identification information is "1". FIG. 21C illustrates a help URL (J3) in which the event identification information is "1" and the user identification information is "2".

Although an example in which the help URL is used as the help destination has been described above, an image part, a submit button, or a hyperlink (help link) that is linked to the help URL may also be used as the help destination. For example, at least one of the shape, the size, and the color of the help destination included in the web page may be changed corresponding to the degree of importance of the game event. At least one of the shape, the size, and the color of the help destination included in the web page may be changed corresponding to the achievement rate of the game event.

At least one of the shape, the size, and the color of the help destination included in the web page may be changed corresponding to the degree of importance of the game event.

FIG. 22 illustrates an example of a help request game screen.

For example, the help destinations (help URL) J1, J2, and the like corresponding to each event are displayed within the game screen displayed on the display section of the terminal of the user A.

For example, when the server 20 has received the help request data about the game event EV1 executed by the game application from the terminal 10A of the user A, the server 20 generates the help destination J1 corresponding to the game event EV1, and transmits the help destination J1 to the terminal 10 of the user A as the data about the game screen. Therefore, the URL corresponding to the game event EV1 is displayed on the terminal 10A. Likewise, the help destination J2 corresponding to the game event EV2 is displayed on the terminal 10A. This makes it possible for the user A to use the URL in his blog or the like.

When the server 20 has not received the help request data about a game event (e.g., EV4) executed by the game application from the terminal 10A of the user A, the server 20 transmits game screen data including a submit button for transmitting the help request data (data that requests generation of the help destination) to the server. Specifically, the submit button for transmitting the help request data (data that requests generation of the help destination) is displayed on the terminal 10A.

4-3. Notice Information-Providing Process

In one embodiment of the invention, when the server 20 has received notice information request data about the user A from the terminal, the server 20 transmits notice information (e.g., blog diary information data or message data about the user A or a user who maintains a friend relationship with the user A) that is linked to the user identification information about the user A.

When the server 20 has received the notice information request data about the user A from the terminal, the server 20 transmits the notice information about the user A including the help destination (help URL).

Figure 23:
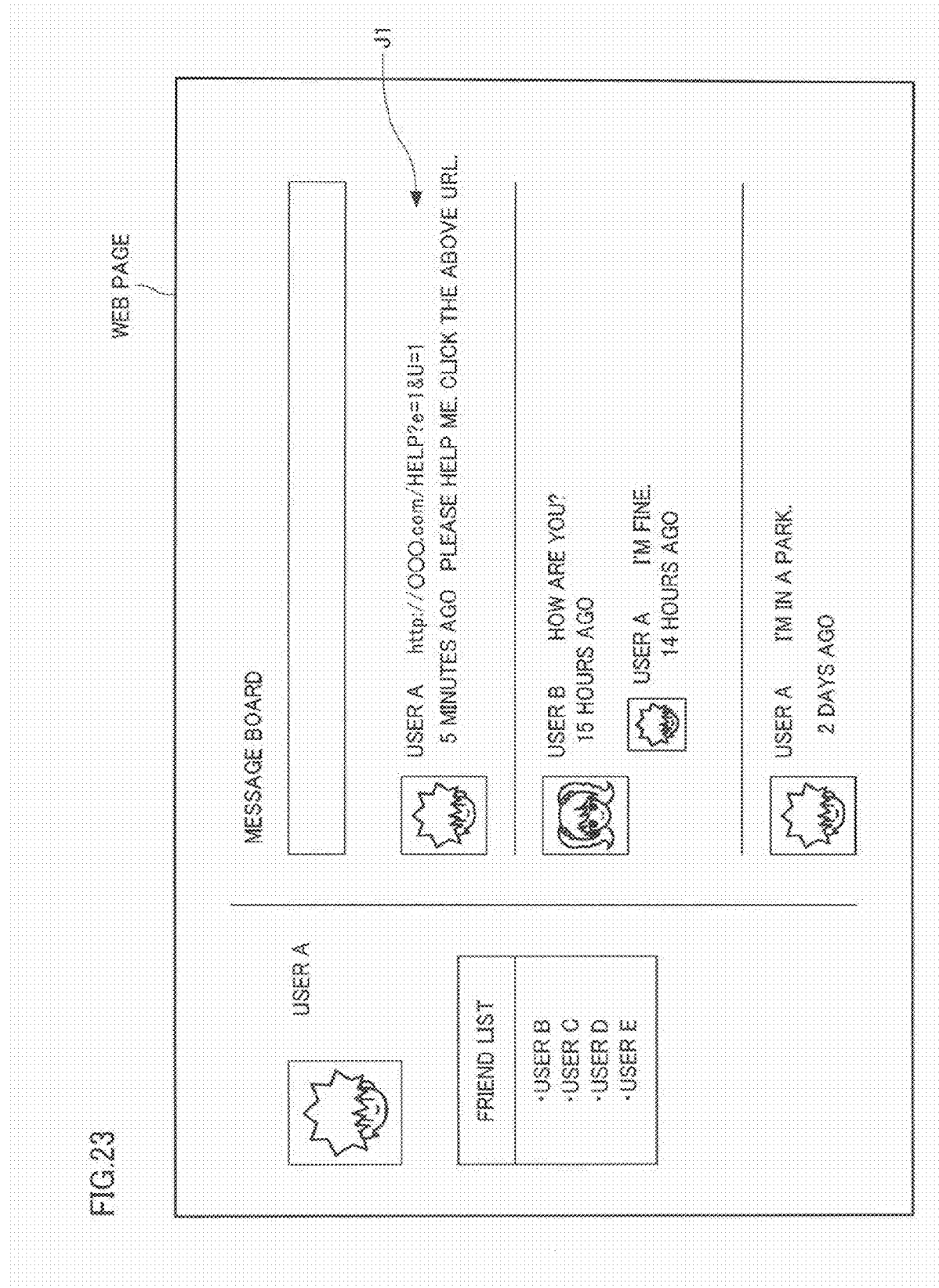
FIG. 23 is a diagram illustrating a notice information-providing process according to one embodiment of the invention.

As illustrated in FIG. 23, when the server 20 has received the notice information request data about the user A from the terminal 10B, the server 20 transmits a web page of notice information 31 about the user A including the help destination J1 to the terminal 10B, for example.

4-4. Parameter Calculation Process Based on Help Destination Access Request

In one embodiment of the invention, when the server 20 has received a help destination access request from the terminal, the server 20 performs a parameter calculation process that changes the event parameter of the game event based on the event identification information linked to the help destination regardless of whether or not the user of the terminal is a member of the game application.

For example, when the server 20 has received an access request for the help destination J1 corresponding to the game event EV1 (that requires the player character to defeat the enemy character EH within a predetermined period (e.g., within 24 hour from the time when the game event has been generated)) from the terminal 10B, the server 20 decreases the strength parameter LP2 of the enemy character EH that is the event parameter of the game event EV1 based on the event identification information "1" linked to the help destination J1. For example, when the server 20 has received an access request for the help destination I1 corresponding to the game event EV1 a plurality of times, the server 20 may decrease the strength parameter LP2 of the enemy character EH corresponding to the reception count of the access requests. Specifically, the server 20 may subtract "10" from the strength parameter LP2 of the enemy character EH when the reception count of the access requests is "10". Therefore, another user can easily help the user A regardless of whether or not the other user is a member of the game application.

When the server 20 has received the help request data about a game event executed by the game application from the terminal of the user A, the server 20 may decrease the user point parameter of the user A used during the game process of the game application. When the server 20 has received an access request for the help destination J1 requested by the user A from the terminal, the server 20 may increase the user point parameter of the user A used in the game application.

Therefore, the user A can acquire the user points when another user has transmitted an access request for the help destination J1, and can utilize the user points for the help process. This further improves the game playability.

In one embodiment of the invention, when the server 20 has received an access request for the help destination J1 from the terminal, the server 20 performs the parameter calculation process that changes the event parameter of the game event based on the event identification information linked to the help destination regardless of whether or not the user of the terminal is a member of the game application. The server 20 may determine whether or not the user of the terminal that transmitted the access request for the help destination J1 is a member of the game application.

Specifically, the server 20 determines whether or not the user of the terminal that transmitted the access request for the help destination J1 is a member of the game application based on data included in the access request for the help destination J1. For example, when the server 20 has received an access request for the help destination J1 from the terminal 10B of the user B, the server 20 determines that the user B is a member of the game application when the user identification information about the user B that indicates that the user B is a member of the game application is included in data included in the access request.

When the user B is a member of the game application, the server 20 increases the user point parameter of the user B used during the game process of the game application. This makes it possible to prompt (motivate) a user who is a member of the game application to help another user.

Figure 24A:
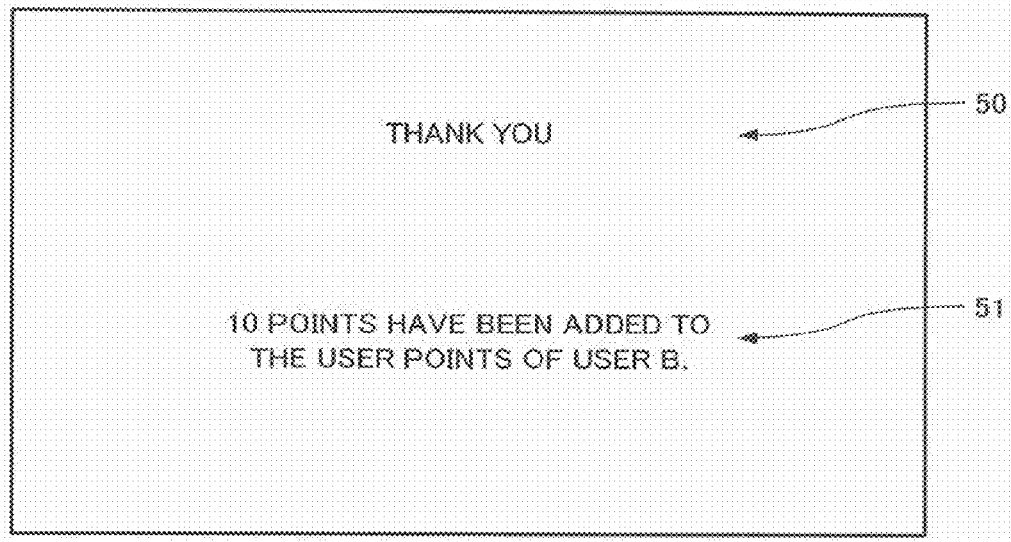
FIGS. 24A and 24B illustrate examples of web data (screen data) transmitted by a server when an access request for a help destination has been received.
Figure 24B:
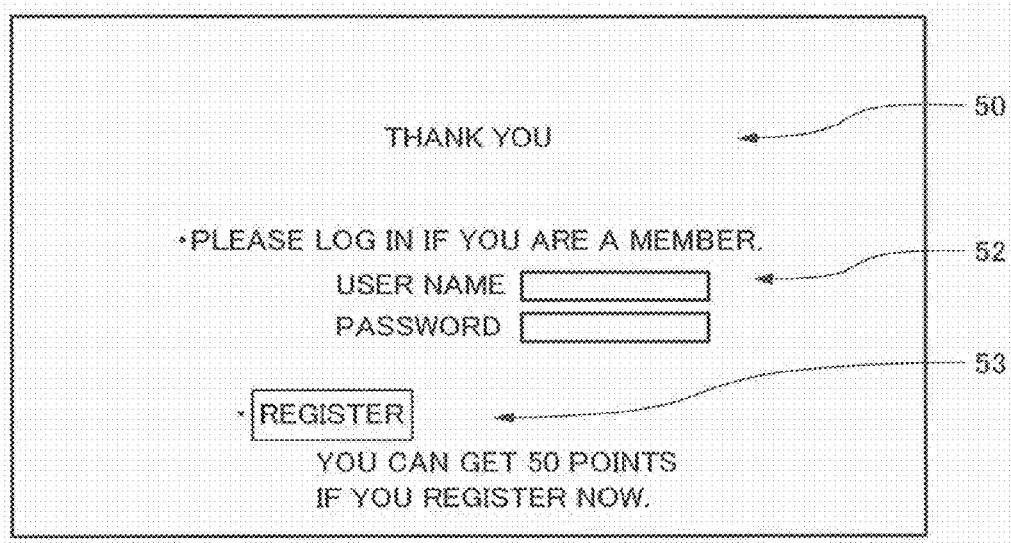

For example, when the server 20 has received an access request for the help destination J1 from the terminal 10B of the user B who is a member of the game application, the server 20 adds 10 points to the user point parameter of the user B. As illustrated in FIG. 24A, the server 20 may transmit data that indicates that points have been added to the user point parameter of the user B to the terminal 10B so that the user B can observe that points have been added to the user point parameter of the user B using the screen of the terminal 10B.

When the user B is not a member of the game application, the server 20 may transmit login prompt information 52 and member registration prompt information 53 to the terminal 10B so that the user B can log in or register himself as a member of the game application using the screen of the terminal 10B. When the user B has successfully logged in, and it has been determined that the user B is a member of the game application, the server 20 increases the user point parameter of the user B used during the game process of the game application. The server 20 may receive information (user information about the user B) necessary for member registration from the terminal 10B of the user B based on the member registration prompt information 53, and may add predetermined bonus points (e.g., 50 points) to the user points of the user B when the user B has registered himself as a member of the game application.

4-5. Help Determination Process

In one embodiment of the invention, when the server 20 has generated the help destination J1 based on the help request data about the game event EV1 from the terminal 10A of the user A, and received an access request for the help destination J1, the server 20 may perform a help determination process that determines whether or not to help the user A based on the game situation of the user A. When the server 20 has determined to help the user A, the server 20 may perform a parameter calculation process that changes the event parameter of the game event EV1.

In one embodiment of the invention, the server 20 performs a calculation process that moves the character CH1 of the user in the game space based on the input information received from the terminal 10A of the user A (see FIG. 17).

Therefore, the server 20 may perform the help determination process that determines whether or not to help the user A based on the positional relationship between the position E6 (i.e., the same position as that of the moving object OB1) of the character CH1 of the user A and the event occurrence position E12 of the game event EV1 in the game space.

For example, the character CH1 can advance by one distance unit (minimum moving distance unit) in the game space. Therefore, the server 20 may determine to help the user A when the distance between the position of the character CH1 of the user A and the event occurrence position of the game event EV1 is within a predetermined distance (e.g., within 2 distance units).

Specifically, the server 20 decreases the strength parameter LP2 of the enemy character EH when the server 20 has received an access request for the help destination J1 based on the game event EV1 generated in response to the request from the user A from the terminal, on condition that the distance between the position E6 of the character CH1 and the event occurrence position E12 is within 2 distance units.

In the example illustrated in FIG. 17, since the distance between the position E6 of the character CH1 and the event occurrence position E12 is within 2 distance units, the server 20 decreases the strength parameter LP2 of the enemy character EH when the server 20 has received an access request for the help destination J1 based on the game event EV1 generated in response to the request from the user A from the terminal.

The server 20 may determine whether or not to help the user A corresponding to the achievement rate of the game event EV1. This makes it possible to help the user A corresponding to the achievement rate of the game event.

For example, the ratio of a decrease in the strength parameter LP2 of the enemy character EH due to a battle to the initial setting value of the strength parameter LP2 of the enemy character EH is used as the achievement rate. For example, when the initial setting value of the strength parameter LP2 of the enemy character EH is 10,000, and a decrease in the strength parameter LP2 of the enemy character EH due to a battle is 2000, the achievement rate is calculated to be 20%.

The server 20 decreases the strength parameter LP2 of the enemy character EH when the server 20 has received an access request for the help destination J1 based on the game event EV1 generated in response to the request from the user A from the terminal, on condition that the achievement rate of the game event EV1 is equal to or higher than a predetermined value (e.g., 80%). Note that the server 20 may decrease the strength parameter LP2 of the enemy character EH when the server 20 has received an access request for the help destination J1 on condition that the achievement rate of the game event EV1 is equal to or lower than a predetermined value (e.g., 20%).

The server 20 may change the event parameter of the game event EV1 based on the event identification information that is linked to the help destination J1 when the server 20 has received an access request for the help destination J1 from the terminal within a predetermined period (help period) that is set based on the time when the help destination J1 has been generated. In this case, since the opportunity for helping another user is limited, it is possible to prompt (motivate) a user to help another user.

Figure 25:
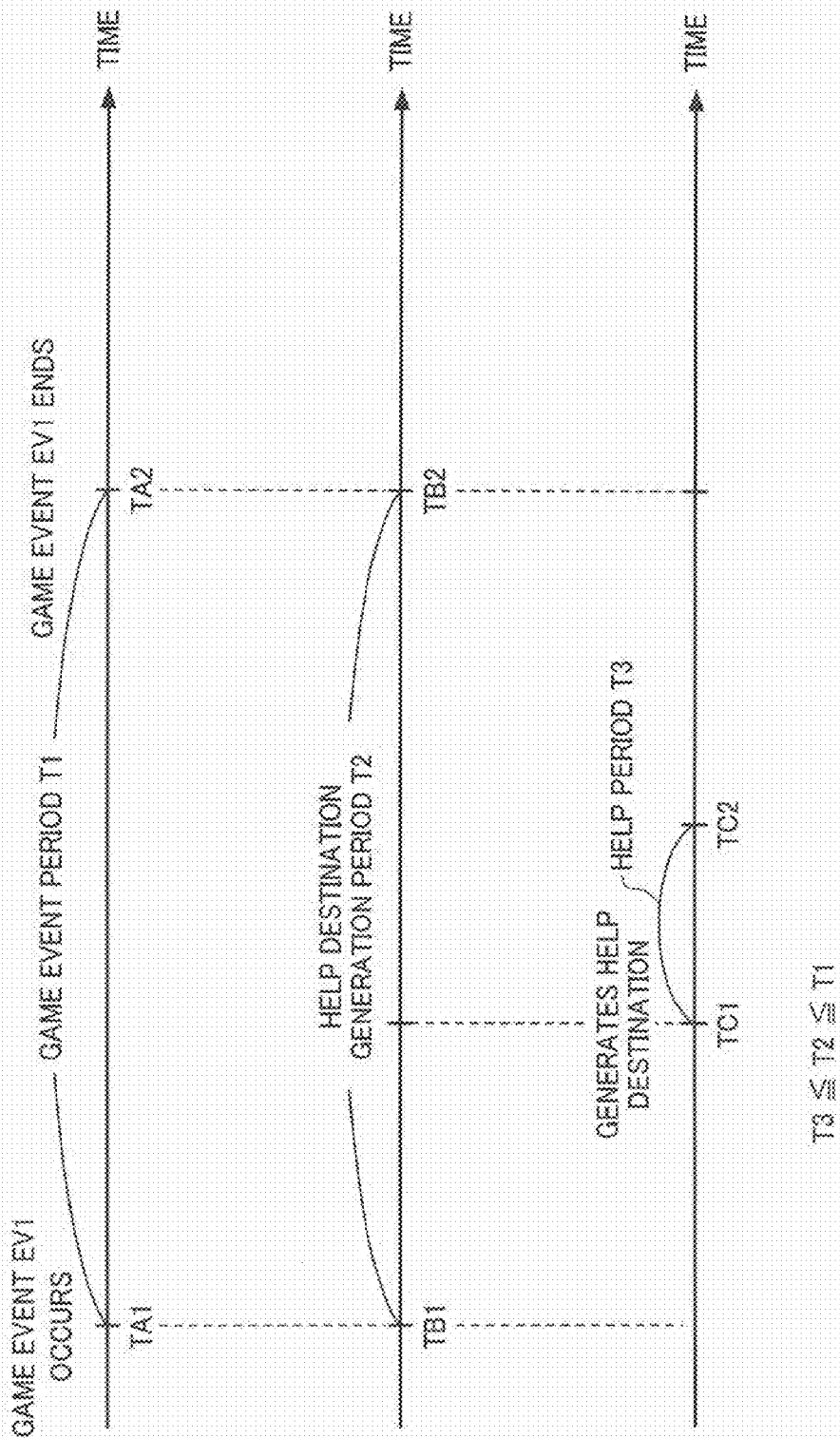
FIG. 25 is a diagram illustrating a help period according to one embodiment of the invention.

As illustrated in FIG. 25, a help destination generation period T2 is set corresponding to the game event period T1, for example. Specifically, the help destination can be generated within a predetermined period T2 within a game event period T1. More specifically, the help destination can be generated within a period from a time TB1 after the game event has been generated (TA1) to a time TB2 before the game event ends (TA2) (T2≤T1).

A help period T3 (i.e., a period in which the viewer can click the help destination) is limited to a predetermined period (e.g., 12 hours) from the time at which the help destination has been generated.

For example, when the time at which the help destination has been generated is referred to as TC1, the server 20 decreases the strength parameter LP2 of the enemy character corresponding to the game event EV1 linked to the help destination J1 when the server 20 has received an access request for the help destination J1 from the terminal 10B within the help period T3 from the time TC1 to a time TC2 (TC2≤TB2≤TA2), for example. When the server 20 has received an access request for the help destination J1 after the time TC2, the server 20 may transmit help period end information to the terminal 10B, for example.

When the server 20 has received an access request for the help destination J1 from the terminal 10B, the server 20 may perform the help determination process that determines whether or not to help the user A based on whether or not the user B of the terminal 10B and the user A of the terminal 10A maintain a friend relationship based on the user identification information about the terminal 10B and the user identification information linked to the help destination J. For example, the server 20 may determine to help the user A when the users A and B maintain a friend relationship, and may determine not to help the user A when the users A and B do not maintain a friend relationship.

When the server 20 has received an access request for the help destination J1 from the terminal 10B, the server 20 may perform the help determination process that determines whether or not to help the user A based on whether or not the user B of the terminal 10B and the user A of the terminal 10A have formed an identical group (party) based on the user identification information about the terminal 10B and the user identification information linked to the help destination J1.

For example, the server 20 may record players (users) who form a group as a group formation history, may determine to help the user A when the server 20 has determined that the users A and B have formed an identical group based on the group formation history, and may determine not to help the user A when the server 20 has determined that the users A and B have not formed an identical group.

4-6. Help Process in Network System

Figure 26:
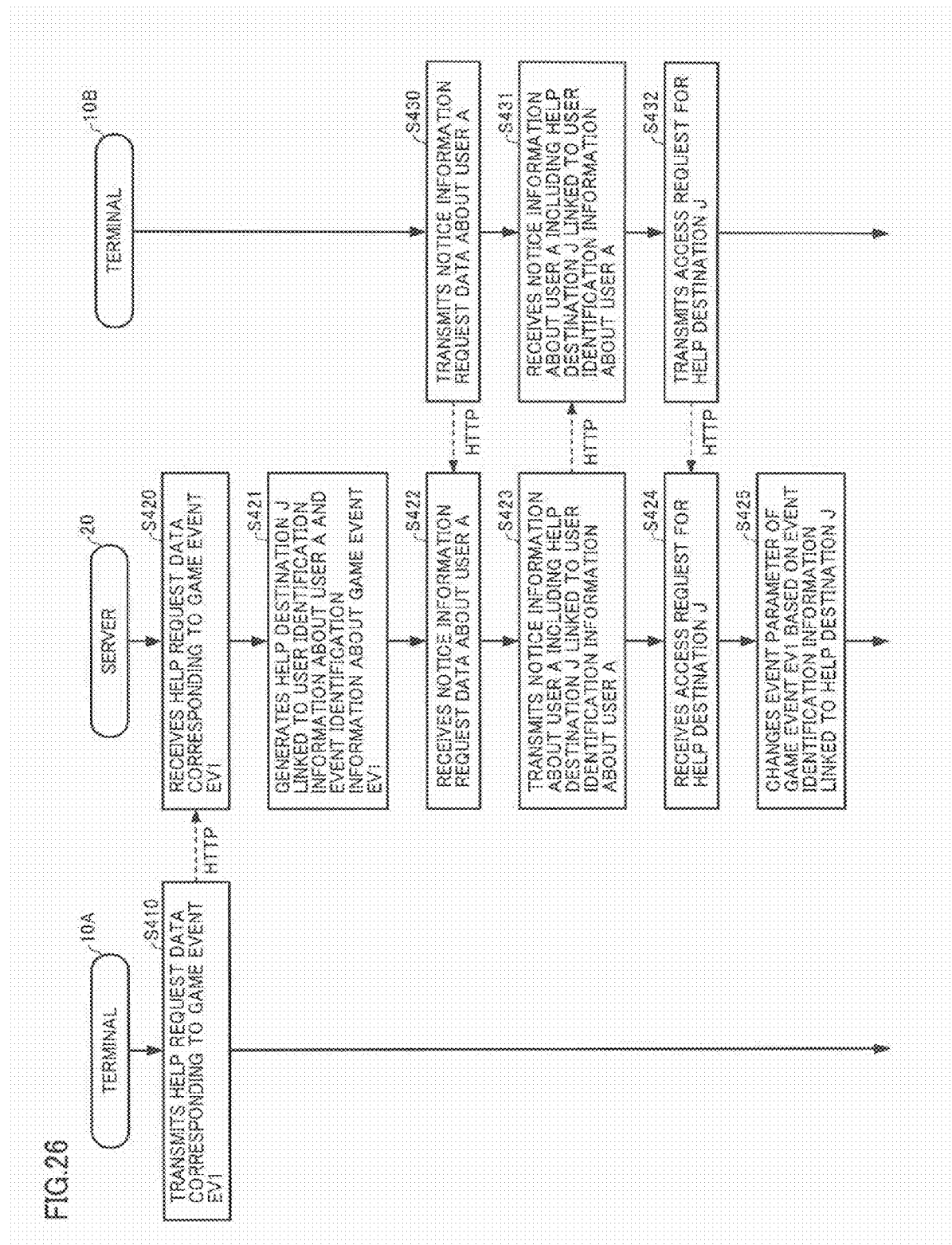
FIG. 26 is a flowchart illustrating a help process performed by a network system according to one embodiment of the invention.

The processes performed by the terminals 10A and 10B and the server 20 are described below with reference to FIG. 26. The following description is given on the assumption that the user A of the terminal 10A is a member of the game application. The user B of the terminal 10B may or may not be a member of the game application.

The terminal 10A transmits the help request data corresponding to the game event EV1 to the server 20 (step S410).

The server 20 receives the help request data corresponding to the game event EV1 (step S420). The server 20 generates the help destination J that is linked to the user identification information about the user A and the event identification information about the game event EV1 (step S421).

The terminal 10B transmits the notice information request data about the user A to the server 20 (step S430).

The server 20 receives the notice information request data about the user A (step S422). The server 20 transmits the notice information about the user A including the help destination J linked to the user identification information about the user A to the terminal 10B (step S423).

The terminal 10B receives the notice information about the user A including the help destination J linked to the user identification information about the user A (step S431).

The terminal 10B transmits an access request for the help destination J to the server 20 (step S432). The server 20 receives the access request for the help destination J (step S424), and changes the event parameter of the game event EV1 based on the event identification information linked to the help destination J.

The server 20 does not change the event parameter of the game event EV1 based on the event identification information linked to the help destination J when the help period T3 has elapsed. In this case, the server 20 transmits a help period end message in response to the access request for the help destination J.

5. Application Example 5-1. Application Example of Battle Process

The above embodiments have been described taking an example in which a deck (placement target object) is selected, and a card is placed at each placement position of the selected deck to perform the battle process. Note that a card used for the battle process may be selected from a card group (a plurality of cards) based on the input information (input information transmitted from the terminal), and the battle process may be performed based on the selected card.

Figure 27A:
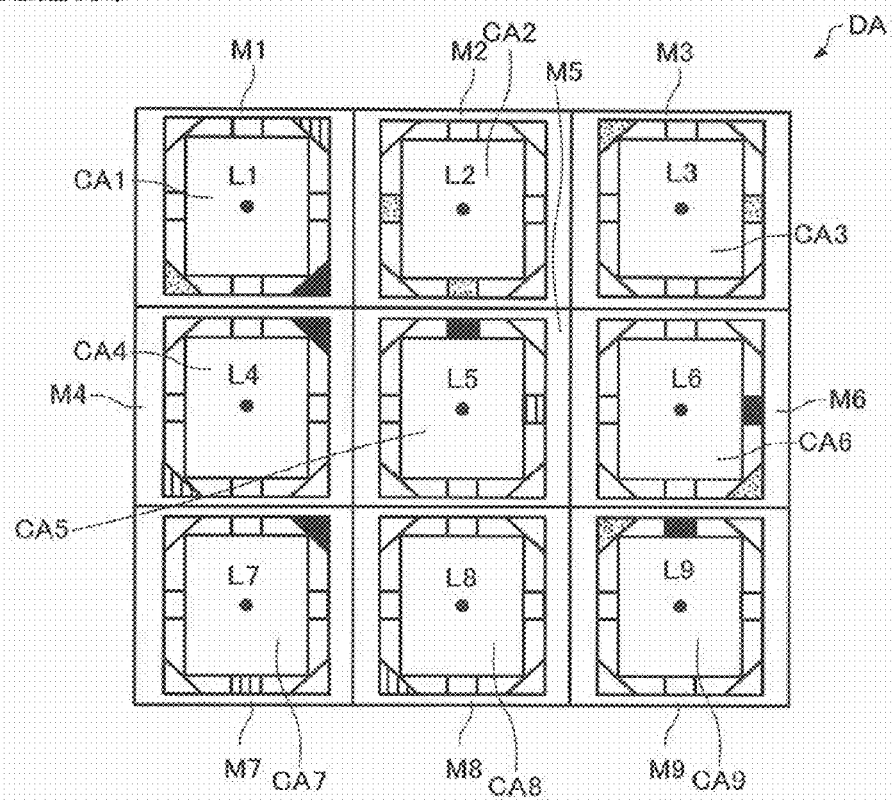
FIGS. 27A and 27B are diagrams illustrating an application example of a battle process.

As illustrated in FIG. 27A, nine different cards CA1 to CA9 are placed in 3×3 squares to generate a card group (action object group or deck DA).

The server 20 selects one or more cards from the card group based on the input information (input information transmitted from the terminal) under predetermined conditions. For example, the server 20 selects the cards CA4 to CA6 (see FIG. 27A). The server 20 performs the character battle process (i.e., action determination process) based on the selected cards CA4 to CA6 and the positions L4 to L6 of the selected cards CA4 to CA6 and/or the execution order of the selected cards. The execution order of the cards may be the same as the selection order of the cards. The execution order of the cards may be determined based on the input information (input information transmitted from the terminal 10). When the starting point and the end point have been determined in advance, the card placed at the starting point may be determined to be the first card, the card placed at the end point may be determined to be the last card, and the order of the remaining cards may be determined based on the input information (or may be set to be the same as the selection order).

Note that the predetermined card selection conditions include (a) a condition whereby the number of selected cards is a specific number, (b) a condition whereby two cards that are consecutively selected (executed) have a first predetermined positional relationship, (c) a condition whereby the first card and the last card have a second predetermined positional relationship, and the like. The card selection conditions may include other conditions.

Figure 27B:
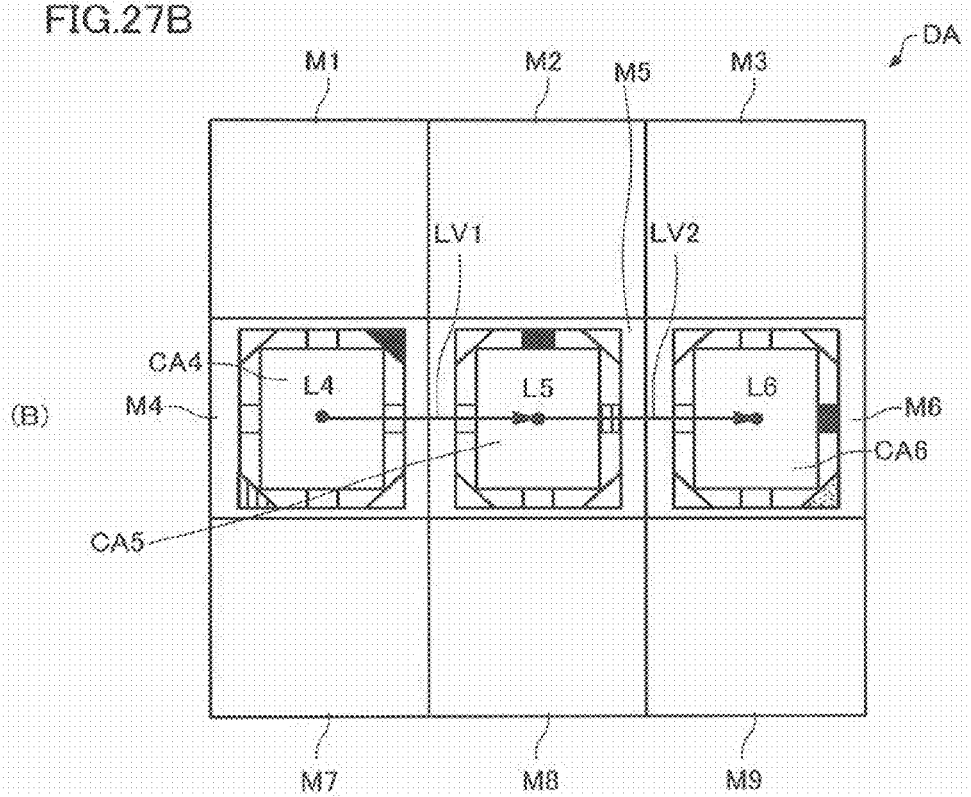

The condition (a) whereby the number of selected cards is a specific number is described below. In FIG. 27B, the specific number is set to "3" in advance so that three cards are selected. The specific number may be determined corresponding to the user points and the user level, or may be randomly determined, for example The condition (b) whereby two cards that are consecutively executed (selected) have a first predetermined positional relationship is a condition whereby the placement position L1 of the card CA4 and the placement position L2 of the next card have an adjacent positional relationship (i.e., first predetermined positional relationship). In FIG. 27B, when the card CA4 placed at the position L4 (square M4) is the first card to be selected (executed), for example, a card placed at the position L1, L2, L5, L7, or L8 (square M1, M2, M5, M7, or M8) is the second card to be selected. When the card CA5 placed at the position L5 (square M5) is the second card to be selected (executed), a card placed at the position L1, L2, L3, L6, L7, L8, or L9 (square M1, M2, M3, M6, M7, M8, or M9) is the third card to be selected. Note that the position L4 adjacent to the position L5 is exceptionally excluded since the card CA4 placed at the position L4 has been selected.

The condition (c) whereby the first card and the last card have a second predetermined positional relationship is a condition whereby the first card and the last card have an adjacent positional relationship (i.e., second predetermined positional relationship), for example. The condition (c) may be a condition whereby the first card and the last card are positioned along an identical straight line (i.e., second predetermined positional relationship). The condition (c) may be a condition whereby a direction that connects the first card and the last card and a direction that connects the last card and the card preceding the last card are identical (i.e., second predetermined positional relationship). For example, when five cards can be placed on the deck, the condition (c) may be a condition whereby a direction from the first card to the second card and a direction from the fourth card and the fifth card are identical.

The cards selected by the player may be displayed on the game screen (see FIG. 27B). The placement order (see LV1 and LV2) corresponding to the execution order may be displayed so that the player can easily determine the execution order.

5-2. Application Example of Game System

The battle process according to the embodiments of the invention that utilizes the card may be performed by a game system (game device). Specifically, the embodiments of the invention may be applied to a game system that performs the battle process in the game space using the card.

5-3. Game Device that Utilizes Actual Card

The embodiments of the invention may be applied to a game system that performs a game system using an actual card. For example, a pattern as illustrated in FIG. 8 may be printed on the card. The game system may include a card reader, and card data about the card read by the game system may be placed at the placement position of the deck in the game space, and used to perform the battle process.

5-4. Other

The embodiments of the invention may also be applied to various games (e.g., racing game, music game, and fighting game) other than a role-playing game and a battle game. Specifically, the embodiments of the invention may be applied to another game that allows a plurality of users to battle each other.

The invention is not limited to the above embodiments. Various modifications and variations may be made. For example, any term cited with a different term having a broader meaning or the same meaning at least once in the specification and the drawings may be replaced by the different term in any place in the specification and the drawings.

The invention includes various other configurations substantially the same as the configurations described in connection with the above embodiments (e.g., a configuration having the same function, method, and results, or a configuration having the same objective and effects). The invention also includes a configuration in which an unsubstantial section (part) described in the embodiments is replaced by another section (part). The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium storing a server program that transmits data to terminals including a first terminal and a plurality of second terminals via a network in response to access requests, the server program causing a computer to function as:
    a member determination section that, when game play request data from one of the terminals has been received, determines whether or not a user of the one of the terminals is a member of a game application based on the received game play request data;
    a game service-providing section that transmits game information about the game application to the one of the terminals when the game play request data has been received from the one of the terminals and the user of the one of the terminals has been determined to be a member of the game application;
    a help destination generation section that:
        transmits, to the first terminal, game screen data that is data for requesting help and transmitting help request data to the server that requests generation of a help destination based on user input of the user at the first terminal,
        when the help request data about a game event executed by the game application has been received from the first terminal in response to the user input, generates the help destination being network location information that includes a value of user identification information about a first user and a value of event identification information about the game event, the first user being the user of the first terminal and has been determined to be a member of the game application, the help destination being published on an online service that is different from a game online service by the game application, the published help destination being accessed through a communication medium via the network of the online service by one of a plurality of second users who are users of the second terminals, the communication medium being provided by the online service which is unrelated to the game online service by the game application; and
    a notice information-providing section that, when notice information request data about the first user has been received from the second terminal through the communication medium, transmits notice information about the first user including the generated help destination to the second terminal through the communication medium,
    the game service-providing section performing a parameter calculation process that changes an event parameter of the game event based on the value of the user identification information and the value of the event identification information when the help destination is directly accessed by the second terminal through the communication medium,
    wherein the help destination is one of a help URL and a hyperlink that is linked to the help URL.

2. The information storage medium as defined in claim 1, wherein the game service-providing section performs a help determination process that determines whether or not to help the first user based on a game situation of the first user when an access request for the help destination has been received from the second terminal, and then performs a parameter calculation process that changes an event parameter of the game event when the game service-providing section has been determined to help the first user.

3. The information storage medium as defined in claim 2, wherein the game service-providing section performs a movement calculation process that moves a character of the first user in a game space based on input information received from the first terminal, and performs the help determination process that determines whether or not to help the first user based on a positional relationship between a position of the character of the first user and an event occurrence position of the game event in the game space.

4. The information storage medium as defined in claim 3, wherein the game service-providing section determines to help the first user when a distance between the position of the character of the first user and the event occurrence position of the game event is equal to or shorter than a predetermined distance.

5. The information storage medium as defined in claim 2, wherein the game service-providing section determines whether or not to help the first user based on an achievement rate of the game event.

6. The information storage medium as defined in claim 2, wherein the game service-providing section determines whether or not to help the first user based on a predetermined period that is set based on a time at which the help destination has been generated.

7. The information storage medium as defined in claim 1, wherein the game service-providing section increases a user point parameter of the first user used by the game application when an access request for the help destination has been received from the second terminal.

8. The information storage medium as defined in claim 1, wherein the game service-providing section decreases a user point parameter of the first user used by the game application when the help request data about the game event executed by the game application has been received from the first user.

9. The information storage medium as defined in claim 1, wherein the member determination section determines whether or not the second user is a member of the game application based on data included in an access request for the help destination when the access request for the help destination has been received from the second terminal; and
wherein the game service-providing section increases a user point parameter of the second user used by a game process of the game application when the second user is a member of the game application.

10. The information storage medium as defined in claim 1, wherein, at least one of a shape, a size, and a color of the help destination is changed corresponding to a degree of importance of the game event.

11. The information storage medium as defined in claim 1, wherein at least one of a shape, a size, and a color of the help destination is changed corresponding to an achievement rate of the game event.

12. The information storage medium as defined in claim 1, wherein the game service-providing section helps the game event of the first user in the game responsive to access, by the one of the plurality of second users outside the game, of the help destination having the value of the event identification information about the game event and the value of the user identification information about the first user, while the one of the plurality of second users is outside the game of the first user.

13. A server that transmits data to terminals including a first terminal and a plurality of second terminals via a network in response to access requests, the server comprising:
a member determination section that, when game play request data from one of the terminals has been received, determines whether or not a user of the one of the terminals is a member of a game application based on the received game play request data;
a game service-providing section that transmits game information about the game application to the one of the terminals when the game play request data has been received from the one of the terminals and the user of the one of the terminals has been determined to be a member of the game application;
a help destination generation section that:
transmits, to the first terminal, game screen data that is data for requesting help and transmitting help request data to the server that requests generation of a help destination based on user input of the user at the first terminal,
when the help request data about a game event executed by the game application has been received from the first terminal in response to the user input, generates the help destination being network location information that includes a value of user identification information about a first user and a value of event identification information about the game event, the first user being the user of the first terminal and has been determined to be a member of the game application, the help destination being published on an online service that is different from a game online service by the game application, the published help destination being accessed through a communication medium via the network of the online service by one of a plurality of second users who are users of the second terminals, the communication medium being provided by the online service which is unrelated to the game online service by the game application; and
a notice information-providing section that, when notice information request data about the first user has been received from the second terminal through the communication medium, transmits notice information about the first user including the generated help destination to the second terminal through the communication medium,
the game service-providing section performing a parameter calculation process that changes an event parameter of the game event based on the value of the user identification information and the value of the event identification information when the help destination is directly accessed by the second terminal through the communication medium,
wherein the help destination is one of a help URL and a hyperlink that is linked to the help URL.

14. A network system comprising:
a server; and
terminals including a first terminal and a plurality of second terminals, the server and the terminals exchanging data via a network,
the server including:
a member determination section that, when game play request data from one of the terminals has been received, determines whether or not a user of the one of the terminals is a member of a game application based on the received game play request data;
a game service-providing section that transmits game information about the game application to the one of the terminals when the game play request data has been received from the one of the terminals of the user of the one of the terminals has been determined to be a member of the game application;

a help destination generation section that:
  transmits, to the first terminal, game screen data that is data for requesting help and transmitting help request data to the server that requests generation of a help destination based on user input of the user at the first terminal,
  when the help request data about a game event executed by the game application has been received from the first terminal in response to the user input, generates the help destination being network location information that includes a value of user identification information about a first user and a value of event identification information about the game event, the first user being the user of the first terminal and has been determined to be a member of the game application, the help destination being published on an online service that is different from a game online service by the game application, the published help destination being accessed through a communication medium via the network of the online service by one of a plurality of second users who are users of the second terminals, the communication medium being provided by the online service which is unrelated to the game online service by the game application; and
a notice information-providing section that, when notice information request data about the first user has been received from the second terminal through the communication medium, transmits notice information about the first user including the generated help destination to the second terminal through the communication medium,
the game service-providing section performing a parameter calculation process that changes an event parameter of the game event based on the value of the user identification information and the value of the event identification information when the help destination is directly accessed by the second terminal through the communication medium,
the first terminal performing:
  a process that transmits the game play request data to the server and receives game information about the game application under a predetermined condition, and
  a process that transmits the help request data about the game event executed by the game application, and
the second terminal performing:
  a process that transmits the notice information request data about the first user to the server and receives the notice information about the first user including the help destination that is linked to the user identification information about the first user, and
  a process that transmits an access request for the help destination to the server based on input information,
wherein the help destination is one of a help URL and a hyperlink that is linked to the help URL.

15. A game service-providing method that is implemented by a server that transmits data to terminals including a first terminal and a plurality of second terminals via a network in response to access requests, the method comprising:
  determining whether or not a user of one of the terminals is a member of a game application based on game play request data when the game play request data has been received from the one of the terminals;
  transmitting game information about the game application to the one of the terminals when the game play request data has been received from the one of the terminals and the user of the one of the terminals has been determined to be a member of the game application;
  transmitting, to the first terminal, game screen data that is data for requesting help and transmitting help request data to the server that requests generation of a help destination based on user input of the user at the first terminal;
  generating the help destination being network location information that includes a value of user identification information and a value of event identification information about a game event, a first user being the user of the first terminal and has been determined to be a member of the game application, the game event being executed by the game application when the help request data about the game event has been received from the first terminal in response to the user input, the help destination being published on an online service that is different from a game online service by the game application, the published help destination being accessed through a communication medium via the network of the online service by one of a plurality of second users who are users of the second terminals, the communication medium being provided by the online service which is unrelated to the game online service by the game application;
  transmitting notice information about the first user including the generated help destination to the second terminal through the communication medium, when notice information request data about the first user has been received from the second terminal through the communication medium; and
  performing a parameter calculation process that changes an event parameter of the game event based on the value of the user identification information and the value of the event identification information when the help destination is directly accessed by the second terminal through the communication medium,
wherein the help destination is one of a help URL and a hyperlink that is linked to the help URL.

16. A non-transitory computer-readable information storage medium storing a server program that transmits data to terminals including a first terminal and a second terminal via a network in response to access requests, the server program causing a computer to function as:
  a member determination section that, when game play request data from one of the terminals has been received, determines whether or not a user of the one of the terminals is a member of a game application based on the received game play request data;
  a game service-providing section that transmits game information about the game application to the one of the terminals when the game play request data has been received from the one of the terminals and the user of the one of the terminals has been determined to be a member of the game application;
  a help destination generation section that:
    transmits, to the first terminal, game screen data that is data for requesting help and transmitting help request data to the server that requests generation of a help destination based on user input of the user at the first terminal,
    when the help request data about a game event executed by the game application has been received from the first terminal in response to the user input, generates the help destination being network location information that includes a value of user identification information about a first user and a value of event identification information about the game event, the first user being the user of the first terminal and has been determined to be a member of the game application, the help destination being accessed through a communication medium via the network by a second user who is a user of the second terminal, the communication medium being provided by a non-game online network service which is unrelated to a game online network service of the game application, and being different from a communication medium provided by the game online network service; and a notice information-providing section that, when notice information request data about the first user has been received from the second terminal through the communication medium, transmits notice information about the first user including the generated help destination to the second terminal through the communication medium, the game service-providing section performing a parameter calculation process that changes an event parameter of the game event based on the value of the user identification information and the value of the event identification information when the help destination is directly accessed by the second terminal through the communication medium, wherein the help destination is one of a help URL and a hyperlink that is linked to the help URL.

* * * * *